(12) United States Patent
Smeja

(10) Patent No.: US 9,353,527 B2
(45) Date of Patent: May 31, 2016

(54) ROOF MOUNTING BRACKET AND BARRICADE SYSTEM

(71) Applicant: Sno Gem Inc., McHenry, IL (US)

(72) Inventor: Michael V. Smeja, Inverness, IL (US)

(73) Assignee: Sno-Gem Incorporated, McHenry, IL (US)

( * ) Notice: Subject to any disclaimer, the term of this patent is extended or adjusted under 35 U.S.C. 154(b) by 0 days.

(21) Appl. No.: 14/519,048

(22) Filed: Oct. 20, 2014

(65) Prior Publication Data

US 2016/0060869 A1    Mar. 3, 2016

Related U.S. Application Data

(63) Continuation-in-part of application No. 14/476,664, filed on Sep. 3, 2014.

(60) Provisional application No. 61/873,204, filed on Sep. 3, 2013, provisional application No. 61/893,028, filed on Oct. 18, 2013.

(51) Int. Cl.
*E04D 13/00* (2006.01)
*E04B 1/41* (2006.01)
(Continued)

(52) U.S. Cl.
CPC . *E04D 13/00* (2013.01); *E04B 1/40* (2013.01); *E04D 3/02* (2013.01); *E04B 2001/405* (2013.01)

(58) Field of Classification Search
CPC ..... E04D 13/00; E01D 2101/28; E04C 5/127; E04G 21/3261; F16B 13/141; F24J 2/5203; F24J 2/5249; F24J 2002/5284; F24J 2/5245; F24J 2/5228; F24J 2/5205; F24J 2/5258
USPC ............. 52/698, 173.1, 24; 24/513, 517, 409; 269/165, 172, 203
See application file for complete search history.

(56) References Cited

U.S. PATENT DOCUMENTS 6,688,047 B1    2/2004 McNichol
7,100,338 B2    9/2006 Haddock
(Continued)

OTHER PUBLICATIONS

Martin Ferrier, "Rhino-Rack Aerodynamic & Heavy Duty Roof Rack Systems", Apr. 26, 2001, Rydalmere, Australia.
(Continued)

*Primary Examiner* — Beth Stephan
(74) *Attorney, Agent, or Firm* — Reed Smith LLP

(57) ABSTRACT

A roof mounting bracket and roof mounting snow retention system are disclosed, in which the bracket creates a deformation in a roof panel seam using opposing set points. In a preferred embodiment, a generally U-shaped bracket includes two or more threaded fasteners in a first arm of the bracket and one or more opposing threaded fasteners in the second arm. Void in bracket is placed over the panel seam, with the first arm on a first side of the seam and the second arm on the opposite side of the seam. The opposing contact points of the screw heads create a "wave" deformation in the seam, securing the bracket to the seam. The opposing set points of the present invention allow secure attachment of the bracket to the seam without having to "dimple" or dent the panel seam using a single set screw, requiring less force by the user. In certain embodiments, the bracket includes a slidably removable compression member to accommodate wide or narrow seam roofs. A roof mounting system uses includes the brackets and a retention member engaged to the brackets. In certain embodiments, the roof mounting system includes a decorative panel slidably engaged to the retention member. In certain embodiments the brackets include a cavity for receiving a self-tapping screw connecting the retention member to the bracket.

29 Claims, 21 Drawing Sheets

(51) Int. Cl.
*E04D 3/02* (2006.01)
*E04B 1/38* (2006.01)

(56) References Cited

U.S. PATENT DOCUMENTS

| | | | | |
|---|---|---|---|---|
| 7,386,922 B1* | 6/2008 | Taylor | | E04D 13/10 24/525 |
| 7,513,080 B1* | 4/2009 | Showalter | | E04D 13/10 403/373 |
| 7,549,253 B2 | 6/2009 | Hockman | | |
| 7,703,256 B2 | 4/2010 | Haddock | | |
| 7,758,011 B2 | 7/2010 | Haddock | | |
| 8,065,838 B2 | 11/2011 | Hockman | | |
| 8,312,678 B1 | 11/2012 | Haddock | | |
| 8,430,372 B2 | 4/2013 | Haddock | | |
| 8,627,617 B2 | 1/2014 | Haddock | | |
| 8,656,649 B2 | 2/2014 | Haddock | | |
| 8,833,714 B2 | 9/2014 | Haddock | | |
| 8,844,234 B2 | 9/2014 | Haddock | | |
| 8,925,263 B2 | 1/2015 | Haddock | | |
| 9,147,785 B2 | 9/2015 | Haddock | | |
| 2002/0088196 A1* | 7/2002 | Haddock | | E04D 3/3608 52/543 |
| 2005/0102958 A1* | 5/2005 | Anderson | | E04D 13/10 52/698 |
| 2005/0257434 A1* | 11/2005 | Hockman | | E04D 13/10 52/24 |
| 2008/0302928 A1* | 12/2008 | Haddock | | E04F 13/0821 248/205.1 |
| 2010/0058701 A1* | 3/2010 | Yao | | E04D 13/12 52/547 |
| 2010/0284737 A1* | 11/2010 | McPheeters | | E04D 13/1476 403/374.3 |
| 2011/0214367 A1* | 9/2011 | Haddock | | F24J 2/5249 52/173.3 |
| 2011/0214368 A1* | 9/2011 | Haddock | | F24J 2/5249 52/173.3 |
| 2011/0247292 A1* | 10/2011 | Li | | F24J 2/5205 52/698 |
| 2012/0267490 A1* | 10/2012 | Haddock | | F24J 2/5249 248/221.11 |
| 2012/0299233 A1* | 11/2012 | Header | | E04D 13/10 269/91 |
| 2012/0304556 A1* | 12/2012 | Teller | | E04D 13/10 52/173.3 |
| 2013/0145711 A1* | 6/2013 | Haddock | | E04F 13/0821 52/478 |
| 2013/0192150 A1* | 8/2013 | DuPont | | F24J 2/5203 52/173.3 |
| 2014/0086680 A1* | 3/2014 | Header | | E04D 13/10 403/374.3 |
| 2014/0102016 A1* | 4/2014 | Hemingway | | F24J 2/5256 52/173.3 |
| 2014/0109496 A1* | 4/2014 | Stapleton | | E04D 13/00 52/173.3 |

OTHER PUBLICATIONS

Thule, Inc., "759 Railing Carrier", May 6, 2004, Seymour, CT.

* cited by examiner

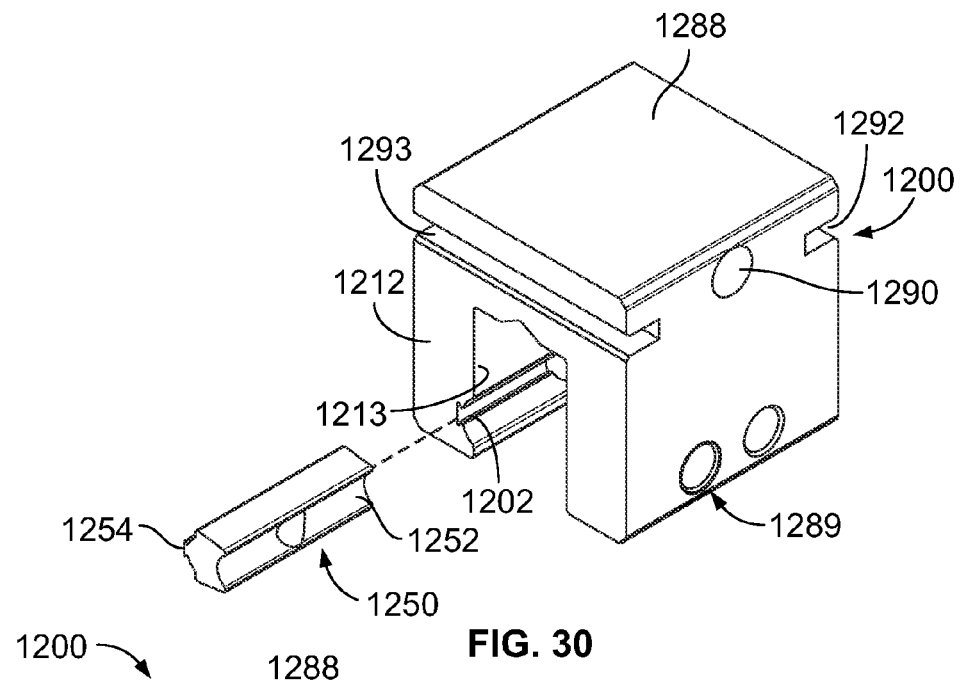
FIG. 30
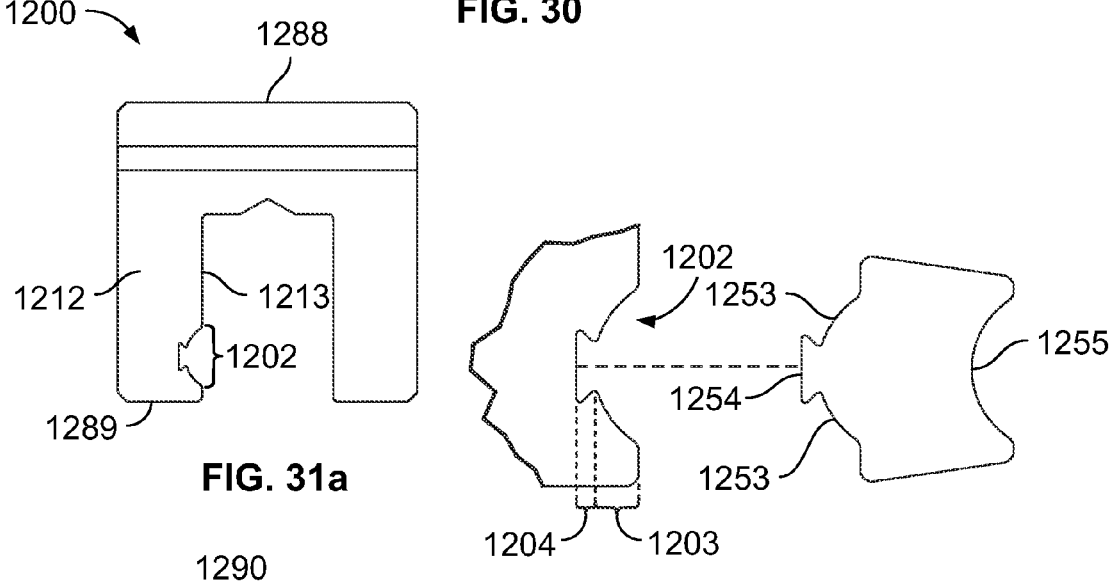
FIG. 31a
FIG. 31b
FIG. 31c
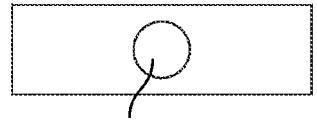
FIG. 32

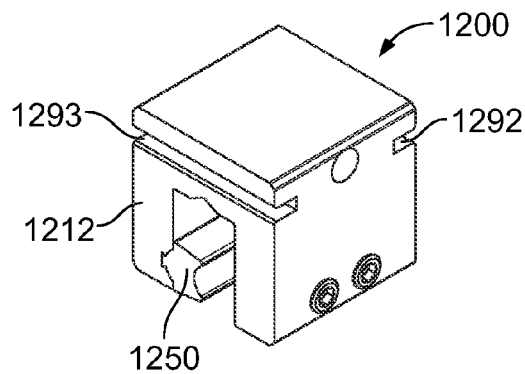
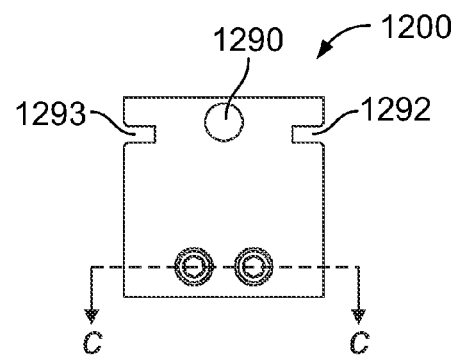
FIG. 33  FIG. 34
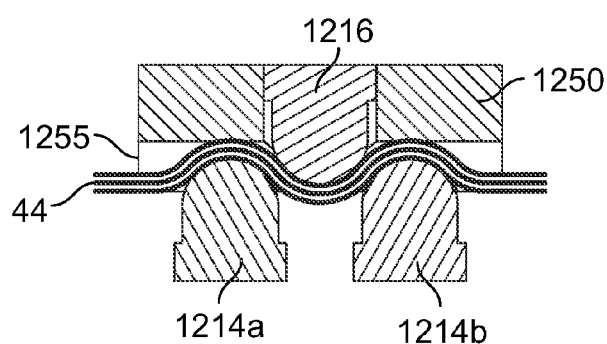
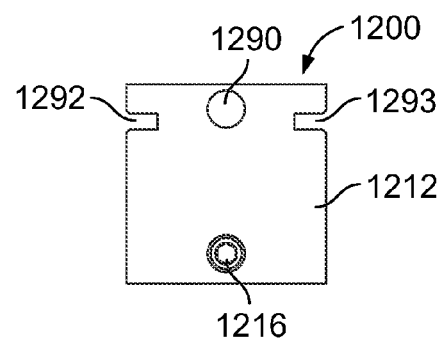
FIG. 35  FIG. 36
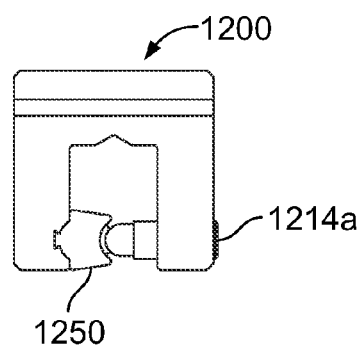
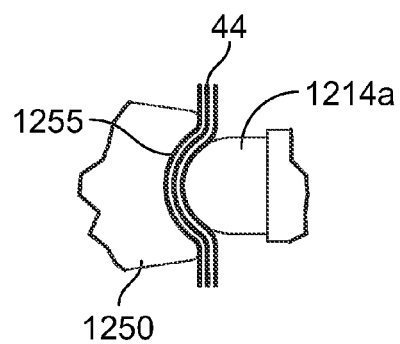
FIG. 37  FIG. 38

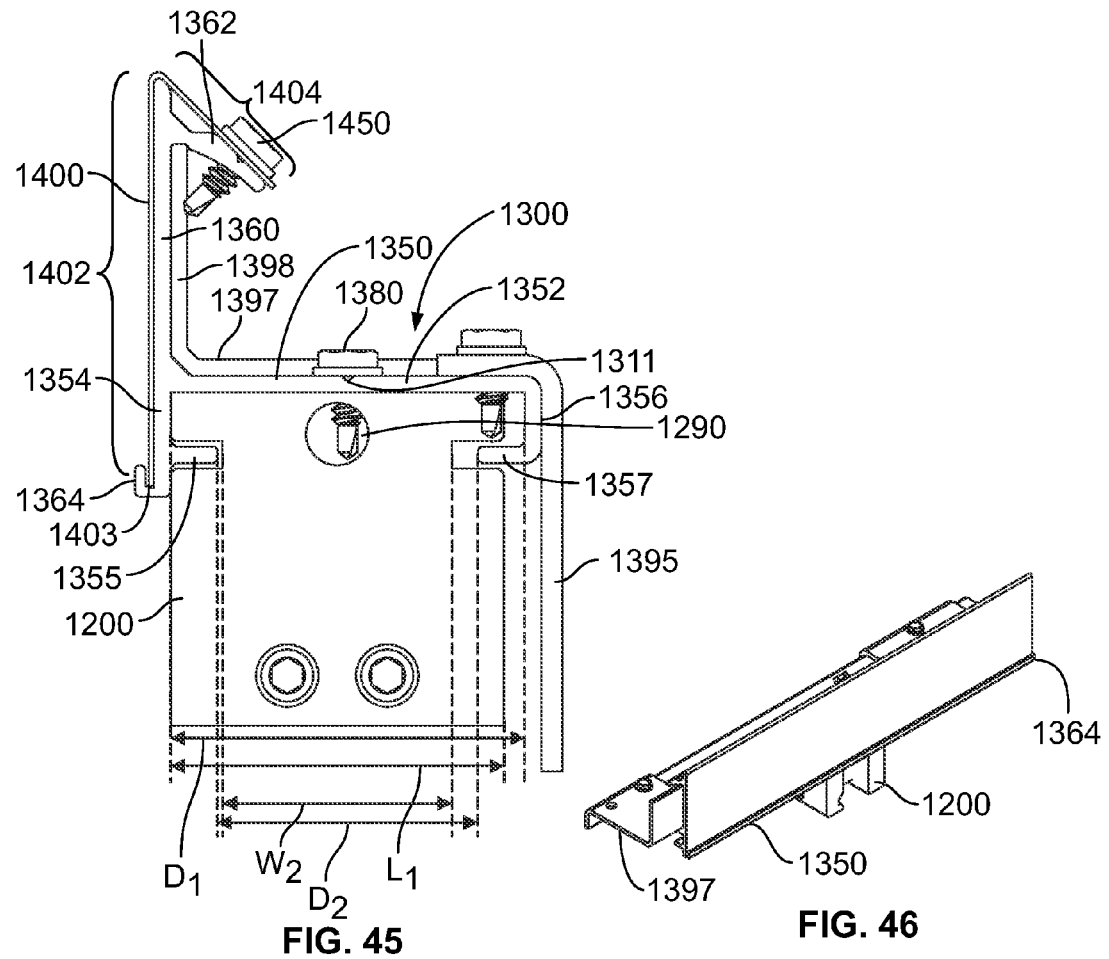
FIG. 45
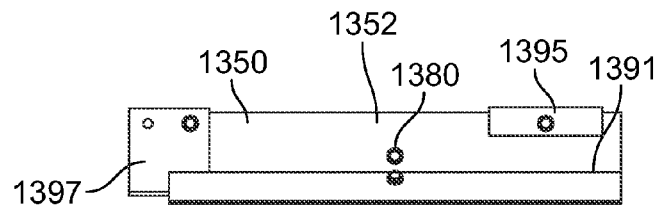
FIG. 46
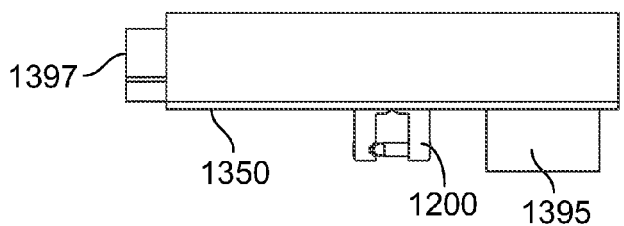
FIG. 47
FIG. 48

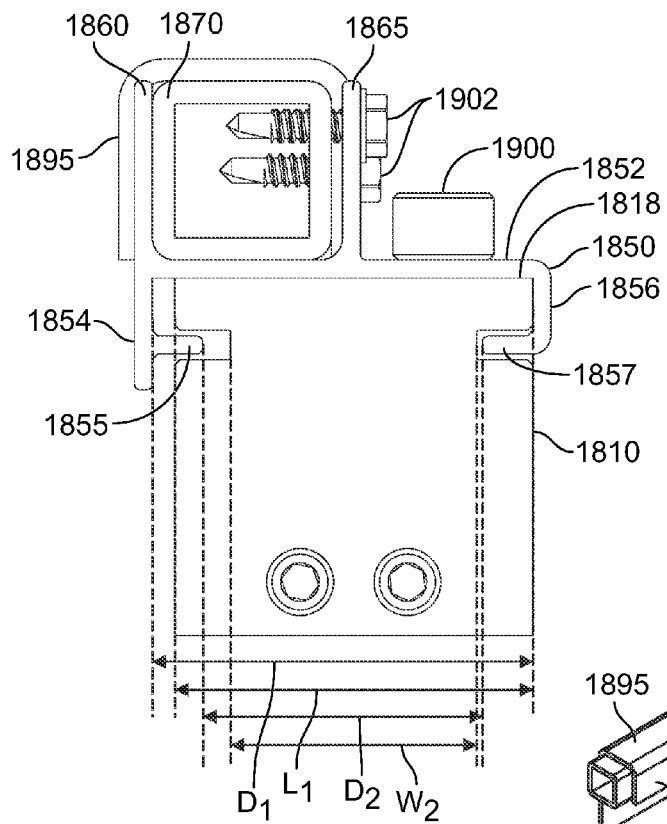
FIG. 55
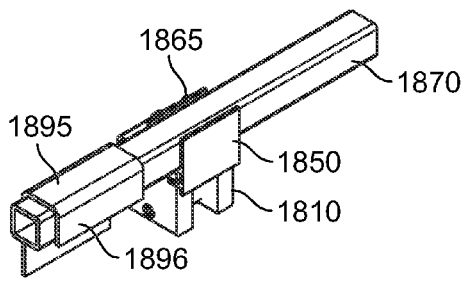
FIG. 56
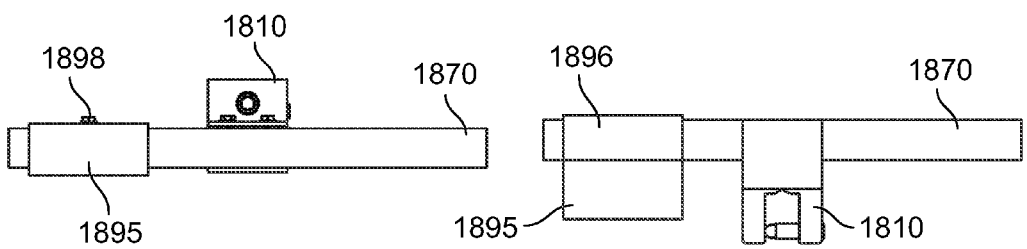
FIG. 57
FIG. 58

ROOF MOUNTING BRACKET AND BARRICADE SYSTEM

CROSS-REFERENCE TO RELATED APPLICATIONS

This application claims priority from U.S. Provisional Patent Application No. 61/873,204, filed on Sep. 3, 2013, U.S. Provisional Patent Application No. 61/893,028, filed on Oct. 18, 2013, and U.S. Non-Provisional application Ser. No. 14/476,664, filed on Sep. 3, 2014, all of which are incorporated herein in their entireties by Reference.

BACKGROUND

Roof mounting systems are used to attach various structures to roofs, such as snow barricades, solar panels, lightning protection, mechanical equipment and other accessories such as signage and poles. Roof mounting systems are known for attaching to various types of roofs and roofing materials, including seamed or metal roofs, wood roofs and membranous roofs. Due to the weight of, or weight that must be supported by, such structures, and the need for the structures to remain stable in various weather conditions, the integrity of the entire system, including the attachment of the structures to the roofs, as well as attachments between the mounting system and the mounted structures, are critical.

In the case of seamed roofs, where roof mounting systems are attached to panel seams of the roof, the brackets or clamps are secured to the panel seams and serve as the support for the attached structures. Existing brackets comprise two-piece brackets in which the two pieces must be secured to each other around the panel seams, requiring additional parts during installation. Other existing bracket systems comprise a single piece, but to secure the bracket to the panel seam the user must create a dimple in the panel seam metal using a screw; these brackets requiring a large amount of torque to be applied by the installing user. Existing brackets also typically include one or more pre-tapped holes into which a fastener is threaded to secure the mounted device to the bracket. Such systems require precise alignment of the fastener and the pre-tapped hole in the bracket. In systems in which the mounted device is secured by multiple brackets, for example, a snow barricade, alignment of the fastener with each of the pre-tapped holes in each of the brackets may be difficult or time consuming.

SUMMARY

The present invention solves the existing limitations. The present invention relates to a roof mounting bracket for mounting roof systems and accessories to panel seam roofs. In particular, in a first aspect, the present invention provides a roof mounting bracket for use with panel seam roofs, wherein the bracket creates a deformation or distortion in the panel seam using opposing set points to secure the bracket to the panel seam. In a second aspect, the present invention provides a snow retention system for panel seam roofs.

A roof mounting bracket for securing accessories to seamed panel roof systems, is disclosed. In one embodiment, the bracket includes a first member, the first member having coupled thereto two or more first projections and a second member disposed opposite the first member, the second member having one or more second projections, wherein the second one or more projections are positioned opposite the spaces between the first projections of the first member. The bracket also has a third member attached to the first member and the second member. The third member, the first member and the second member define a void open at the bottom of the bracket and two sides of the bracket. The bracket includes a cavity passing through the third member and having an axis approximately ninety degrees to the axis of the void. Engaging the first two or more projections to a first side of a seam of a roof panel creates first two or more deformations in the seam; and engaging the projections to an opposite side of the roof panel seam creates a second one or more deformations in the roof panel seam in the spaces between the first deformations, creating a generally wave-shaped distortion of the roof panel seam. In a preferred embodiment, the projections are screws and the tightening the screws cause heads of the screws to engage the seam and create the first two or more deformations and the second one or more deformations in the roof panel seam.

In another embodiment, the bracket is an inverted U-shaped roof mounting bracket for securing accessories to seamed panel roof systems. In this embodiment, the bracket has a first member forming a first side of the bracket, a second member disposed opposite the first member and forming a second side of the bracket and a third member attached to the first member and the second member. The first, second and third members generally define the inverted U shape of the bracket and the void in the U shape. The bracket also includes a cavity passing through the third member and having an axis approximately ninety degrees to the axis of the void. Two or more first projections extend from the first member into the void and defining a space between the projections. Opposite those projections, one or more second projections extending from the second member into the void, wherein the second one or more projections are positioned opposite the spaces between the first projections of the first member.

In a preferred arrangement of this embodiment, the bracket may also include a first keyway formed in the first side of the bracket and having an axis parallel to the axis of the void and a second keyway formed in the second side of the bracket opposite the first keyway and having an axis parallel to the axis of the void.

In another embodiment, of an inverted U-shaped roof mounting bracket for securing accessories to seamed panel roof systems, the bracket includes a first member forming a first side of the bracket, a second member disposed opposite the first member and forming a second side of the bracket and a third member attached to the first member and the second member. The first, second and third members generally defining the inverted U shape of the bracket and the void in the U shape. Like the prior embodiment, two or more first projections extend from the first member into the void and defining a space between the projections, and one or more second projections extend from the second member into the void, wherein the second one or more projections are positioned opposite the spaces between the first projections of the first member. In this embodiment, the bracket further includes a compression member slidably engaged to the second member and disposed in the void. In one configuration, one of the one or more second projections extends through the compression member. The compression member may have a concave wall and a convex wall.

A seamed panel roof mounting system is also disclosed. The system includes an inverted U-shaped roof mounting bracket comprising a first member forming a first side of the bracket, a second member disposed opposite the first member and forming a second side of the bracket, and a third member attached to the first member and the second member, thereby generally defining the inverted U shape of the bracket and the void in the U shape. The bracket has a first keyway on the first member and a second keyway on the second member. The system also includes a retention member that has a base portion and first and second keys that slidably engage the retention member to the bracket. The system also has a panel slidably engaged to a lip on the retention member.

In another embodiment of a seamed panel roof mounting system, the system includes an inverted U-shaped roof mounting bracket that has a first member forming a first side of the bracket that has a first keyway, a second member disposed opposite the first member and that forms a second side of the bracket and has a second keyway and a third member attached to the first member and the second member that forms a top surface of the bracket. The first, second and third members generally defining the inverted U shape of the bracket and the void in the U shape. Two or more first projections extend from the first member of the bracket into the void and defining a space between the projections; and, one or more second projections extend from the second member of the bracket into the void. The second one or more projections are positioned opposite the spaces between the first projections of the first member. The system further includes a retention member that has a base portion adjacent to the top surface of the bracket, a first key slidably engaged to the first keyway and a second key slidably engaged to the second keyway, thereby slidably engaging the retention member to the bracket.

Other objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

FIG. 30 is a perspective view of a further alternative embodiment of a roof mounting bracket having a compression member in accordance with the present invention.

FIG. 31a is a front view of the bracket of FIG. 30.

FIG. 31b is a partial front view of the bracket of FIG. 30.

FIG. 31c is a side view of the bracket of FIG. 30.

FIG. 32 is a side view of the compression member of the bracket of FIG. 30.

FIG. 33 is a perspective view of the bracket of FIG. 30 with fasteners installed.

FIG. 34 is a side view of the bracket of FIG. 33.

FIG. 35 is a cross sectional view along line C-C in FIG. 34 installed on a roof seam.

FIG. 36 is a side view of the bracket of FIG. 33.

FIG. 37 is a front view of the bracket of FIG. 33.

FIG. 38 is a partial front view of the bracket of FIG. 33 installed on a roof seam.

FIG. 45 is a side view of an embodiment of a seamed panel roof mounting system in accordance with the present invention.

FIG. 46 is a perspective view of the system of FIG. 45.

FIG. 47 is a top view of the system of FIG. 45.

FIG. 48 is a front view of the system of FIG. 45.

FIG. 55 is a side view of another embodiment of a seamed panel roof mounting system in accordance with the present invention.

FIG. 56 is a perspective view of the system of FIG. 55.

FIG. 57 is a top view of the system of FIG. 55.

FIG. 58 is a front view of the system of FIG. 55.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
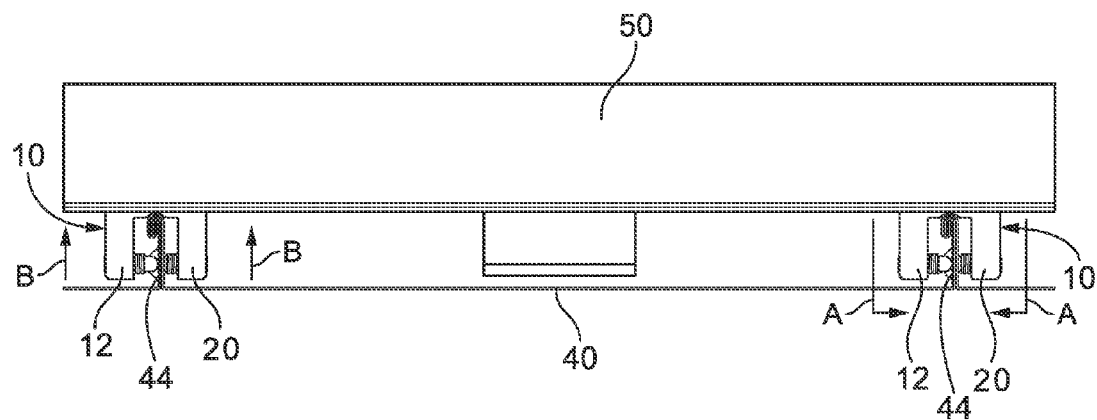
FIG. 1 is a front view of one embodiment of a roof mounting bracket in accordance with the present invention, showing two roof mounting brackets installed on two panels of a roof and a snow guard coupled to the brackets.
Figure 2:
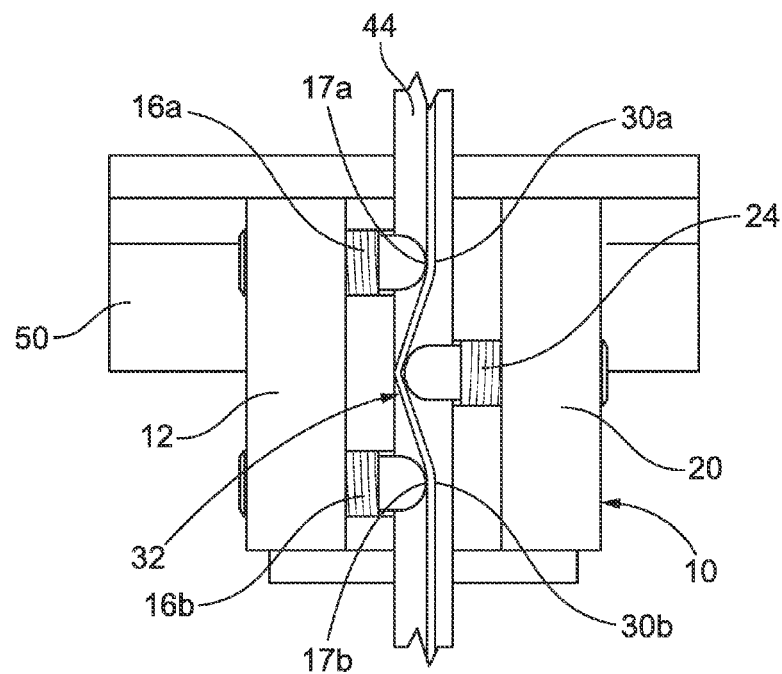
FIG. 2 is a cross-sectional view along line B-B of FIG. 1 showing a roof mounting bracket installed on a roof panel.

FIGS. 1-8 show a preferred embodiment of a roof mounting bracket 10. FIG. 1 shows one embodiment of a roof mounting bracket 10 mounted on a metal panel roof. In this embodiment, bracket 10 can be installed on roofs having varying panel and seam configurations, but is generally installed onto the seam 44 of a roof panel 40 and secured to seam 44 by creating deformations 30a and 30b, 32 in the seam 44 using opposing screws 16a and 16b, 24. In one embodiment, shown in FIGS. 2-4, the bracket 10 is a generally U-shaped bracket having a first arm 12 and a second arm 20 with a void between the first arm 12 and the second arm 20. First arm 12 comprises two threaded fastener receivers 14a, 14b and second arm 20 comprises one threaded fastener receiver 22. The threaded fastener receiver 22 of the second arm 20 is positioned opposite the space between the opposing threaded fastener receivers 14a, 14b of the first arm 12.

In a preferred embodiment, the bracket 10 is manufactured by aluminum extruding. Secondary operations are required to cut, drill, tap, machine and stamp a logo with various tools such as a CNC machine. Each part will then be put through a process called tumbling to create a smooth finish.

Figure 3:
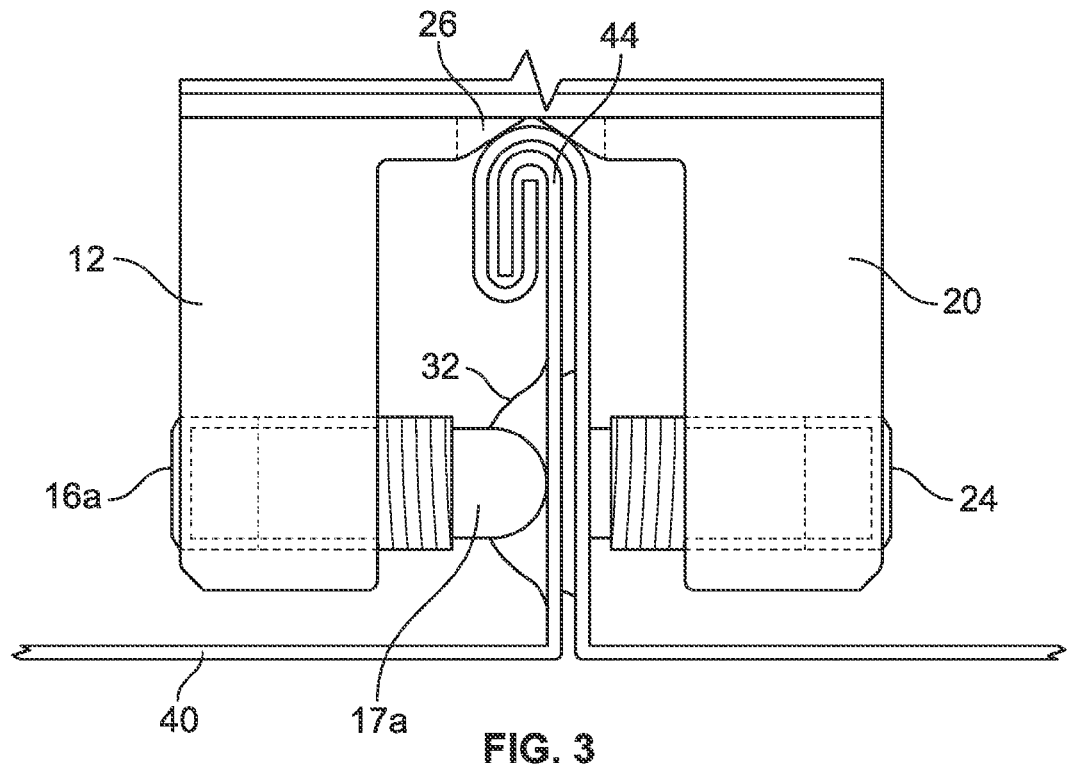
FIG. 3 is a front detail view along line A-A of FIG. 1 showing a roof mounting bracket installed on a roof panel.

To secure the bracket 10 to the panel 40, the void in the bracket 10 is placed over the seam 44 with the first arm 12 on a first side of the seam 44 and the second arm 20 on the opposite side of the seam 44, as shown in FIG. 3. First screws 16a, 16b are inserted into fastener receivers 14a, 14b and threaded therethrough until the heads 17a, 17b contact the seam 44, slightly engaging the seam 44 and creating first deformations 30a, 30b in the seam 44 as the screws 16a, 16b are tightened. Second screw 24 is then inserted into the fastener receiver 22 and threaded therethrough until the head 25 contacts the opposing side of seam 44 in the space between the first deformations 30a, 30b, engaging the seam 44 and creating a second opposing deformation 32 in the seam 44 as the screw 24 is tightened. The opposing deformations 30a, 30b and 32 create a "wave"-shaped distortion in the seam 44, securing the bracket 10 to the seam 44. The opposing deformations 30a, 30b and 32 of the present invention allow secure attachment of the bracket 10 to the seam 44 without having to "dimple" or dent the seam 44 using a single set screw, requiring less force by the user. A preferred embodiment comprises threaded fastener receivers 14a, 14b and 22 aligned the same height on arms 12 and 14 such that opposing deformations 30a, 30b and 32 created by screws 16a, 16b and 24 are in a generally straight line. However, variations in alignment of deformations 30a, 30b and 32 are also contemplated.

Figure 4:
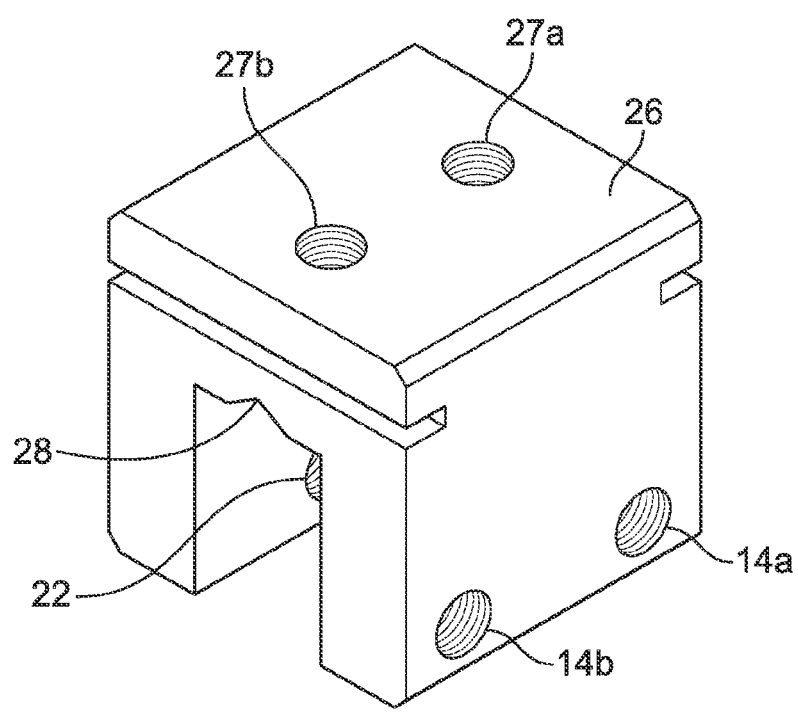
FIG. 4 is a perspective view of one embodiment of a roof mounting bracket in accordance with the present invention.
Figure 5:
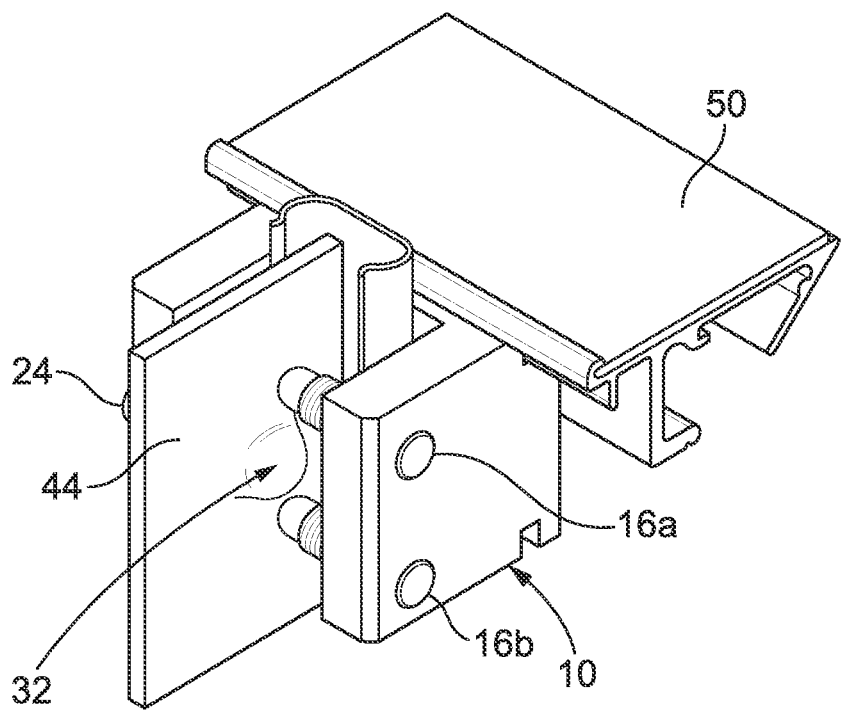
FIG. 5 is a side perspective view of one embodiment of a roof mounting bracket installed on a roof panel and further including a snow barricade coupled to bracket.
Figure 6:
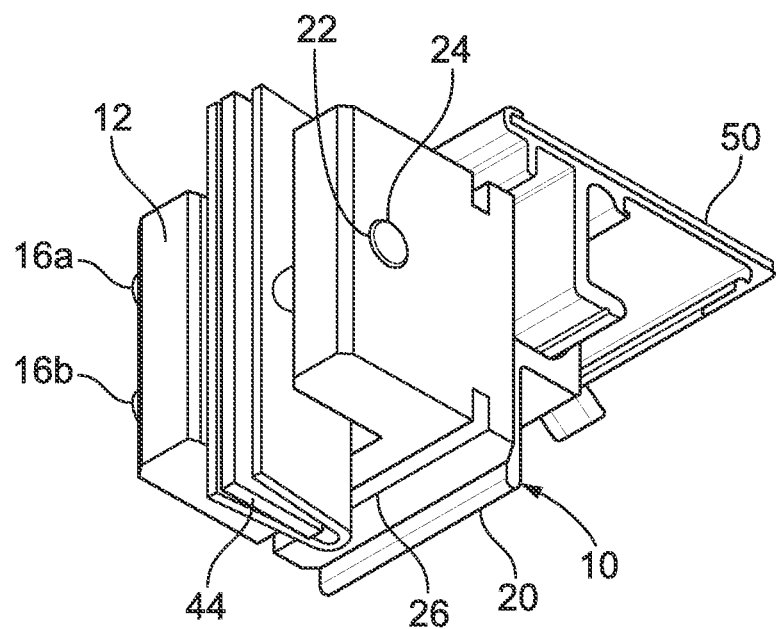
FIG. 6 is a bottom perspective view of one embodiment of a roof mounting bracket installed on a roof panel and further including a snow barricade coupled to bracket.
Figure 7:
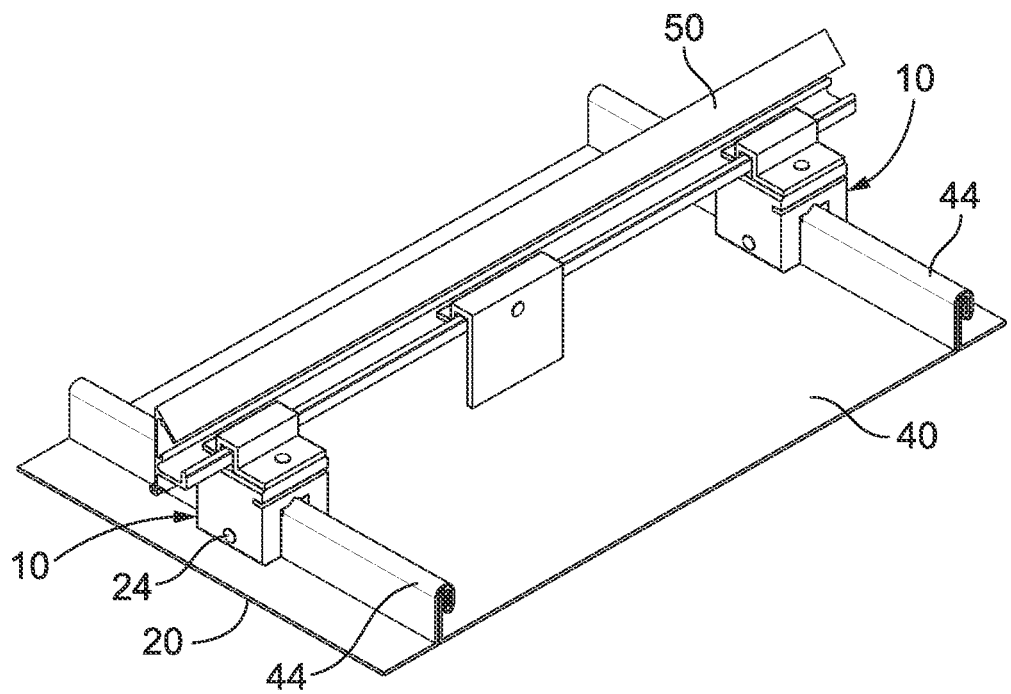
FIG. 7 is a front perspective view of one embodiment of a roof mounting bracket in accordance with the present invention, showing two roof mounting brackets installed on two panels of a roof and further including a snow barricade coupled to the brackets.
Figure 8:
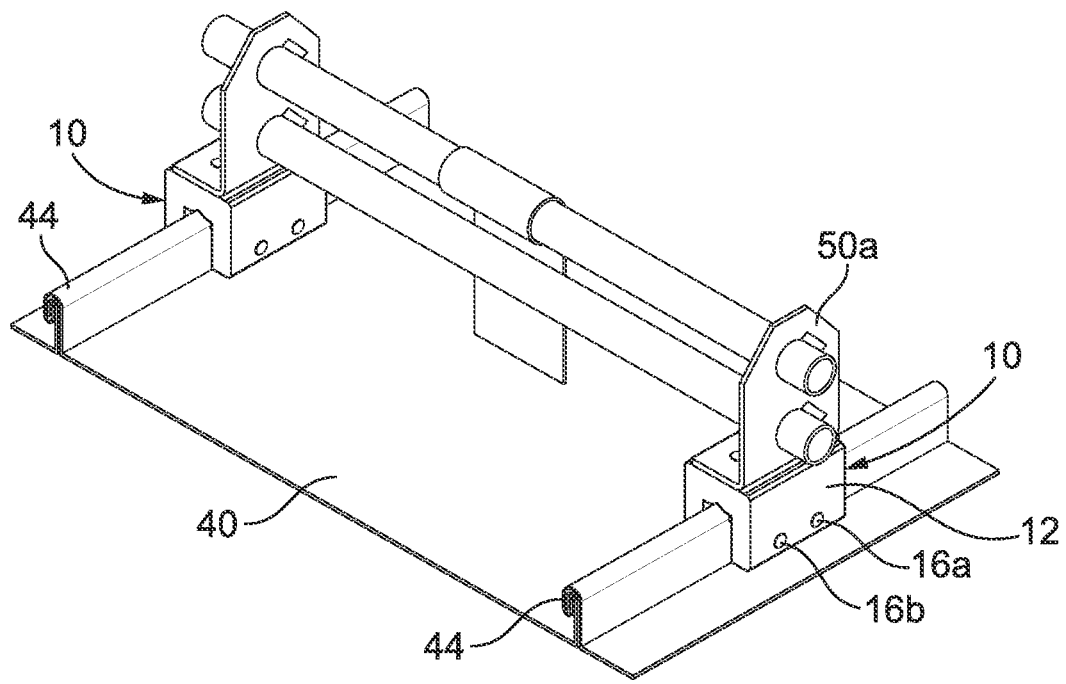
FIG. 8 is a rear perspective view of one embodiment of a roof mounting bracket in accordance with the present invention, showing two roof mounting brackets installed on two panels of a roof and further including a snow barricade coupled to the brackets.

Bracket 10 can be used in numerous applications for installing accessories to roofs. As seen in FIG. 4, top wall 26 can include one or more fasteners 27a, 27b for securing accessories to bracket 10. As seen in FIGS. 1-2 and FIGS. 5-8, various snow barricades 50, 50a can be mounted to bracket 10 for retaining snow behind barricade 50, 50a. Other accessories (not shown), such as solar panels, antennas, mounting poles, lightening protection equipment, mechanical equipment and other similar accessories known in the art can also be secured to bracket 10. Bracket 10 may alternatively include varying numbers of fasteners to accommodate various accessories. In a further alternative (not shown) set positioning points integral to one arm clamp could be used instead of screws.

Figure 9:
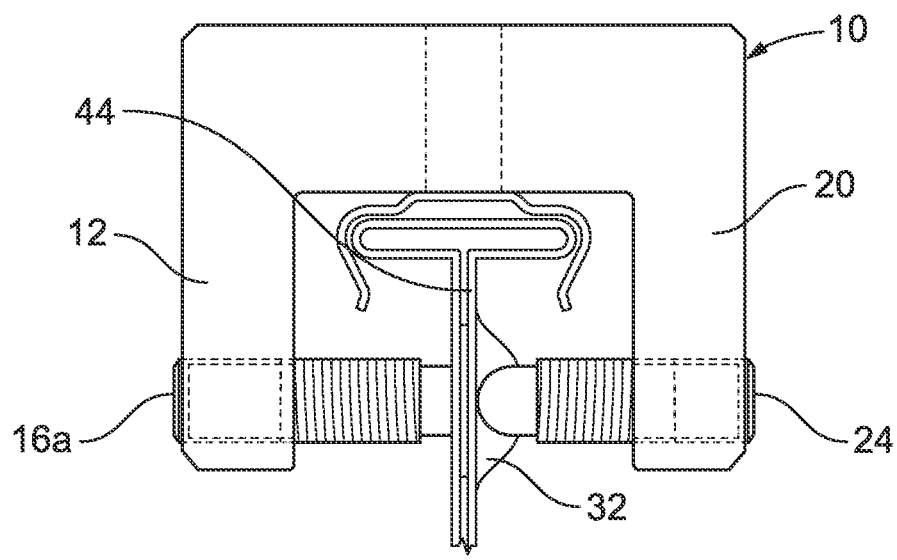
FIG. 9 is a front detail view of another embodiment of a roof mounting bracket installed on an alternative roof panel.
Figure 10:
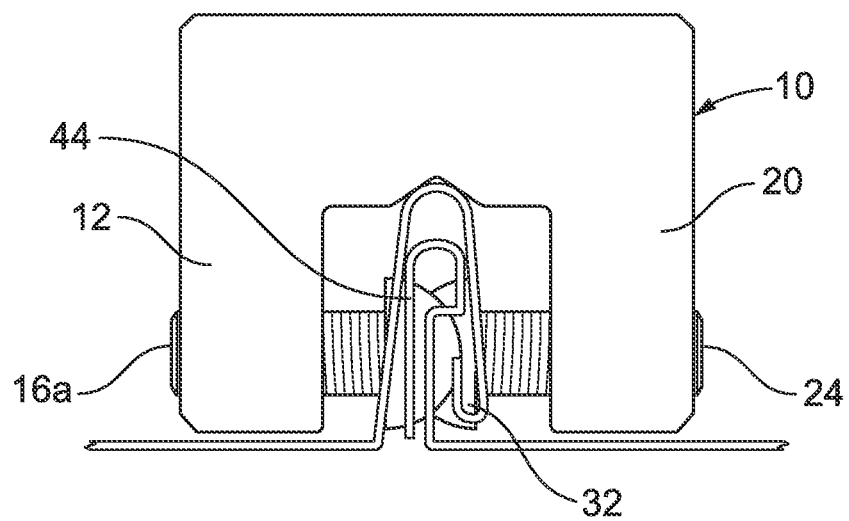
FIG. 10 is a front detail view of another embodiment of a roof mounting bracket installed on an alternative roof panel.
Figure 11:
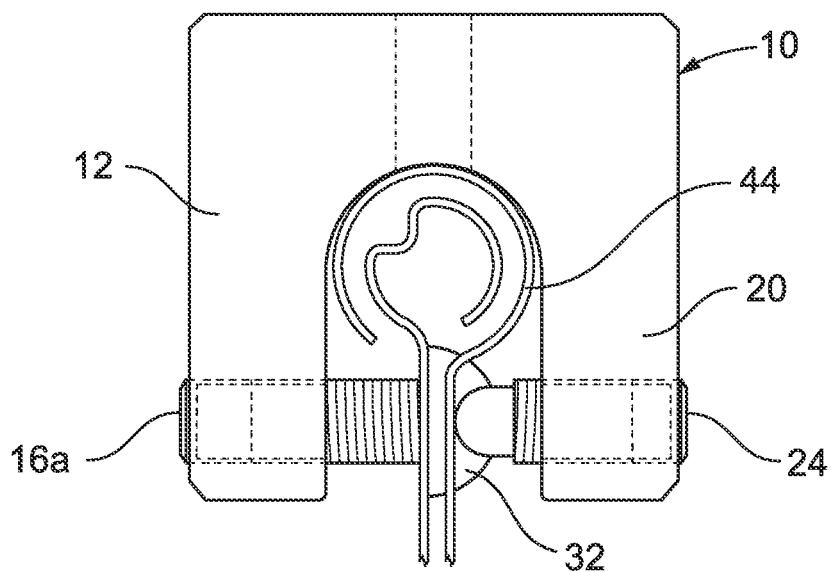
FIG. 11 is a front detail view of another embodiment of a roof mounting bracket installed on an alternative roof panel.

As seen in FIGS. 3-4, in one embodiment bracket 10 may further include, on the underside of the top wall 26, a notch 28 for aligning the seam 44. As seen in FIGS. 9-11, bracket 10 can be configured for use with various types of seams 44. In other embodiments, width of bracket 10 can vary to accommodate wider seams 44, first wall (also referred to herein as the first member) 12 and second wall (also referred to herein as the second member) 20 can vary in thickness, and void can be shaped to fit rounded seams 44. Other variations in bracket 10 shape and configuration are also contemplated to suit the installation needs for particular roof systems and the various accessories to be mounted thereto.

Figure 12:
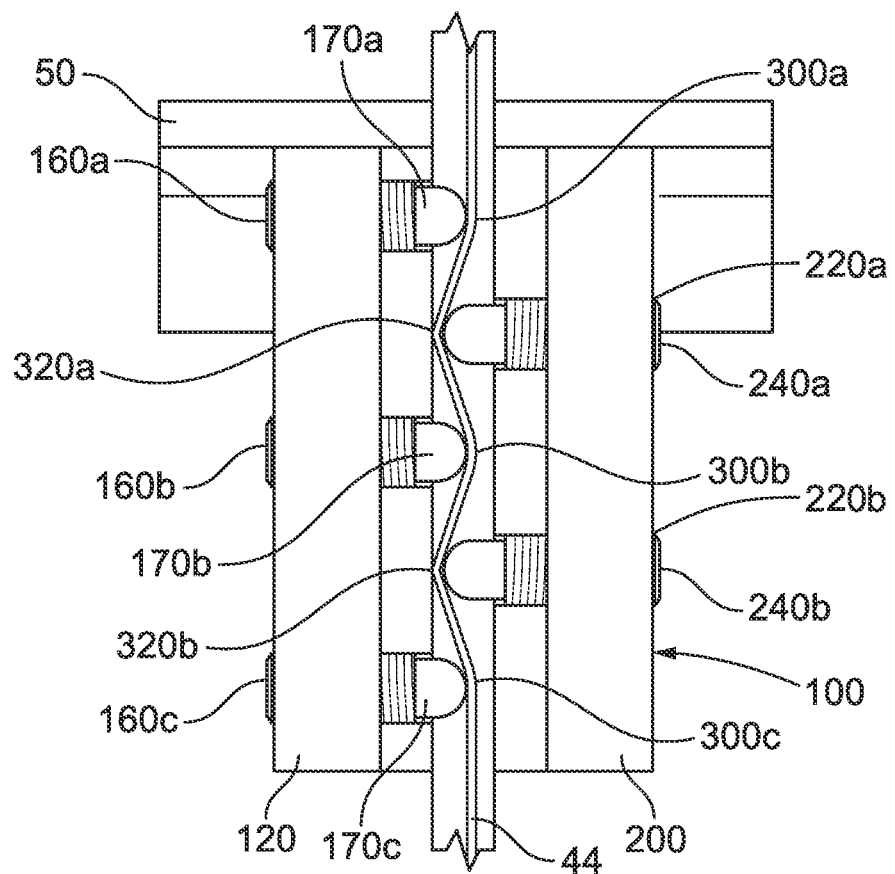
FIG. 12 is a front detail view of an alternative embodiment of a roof mounting bracket installed on a roof panel.
Figure 13:
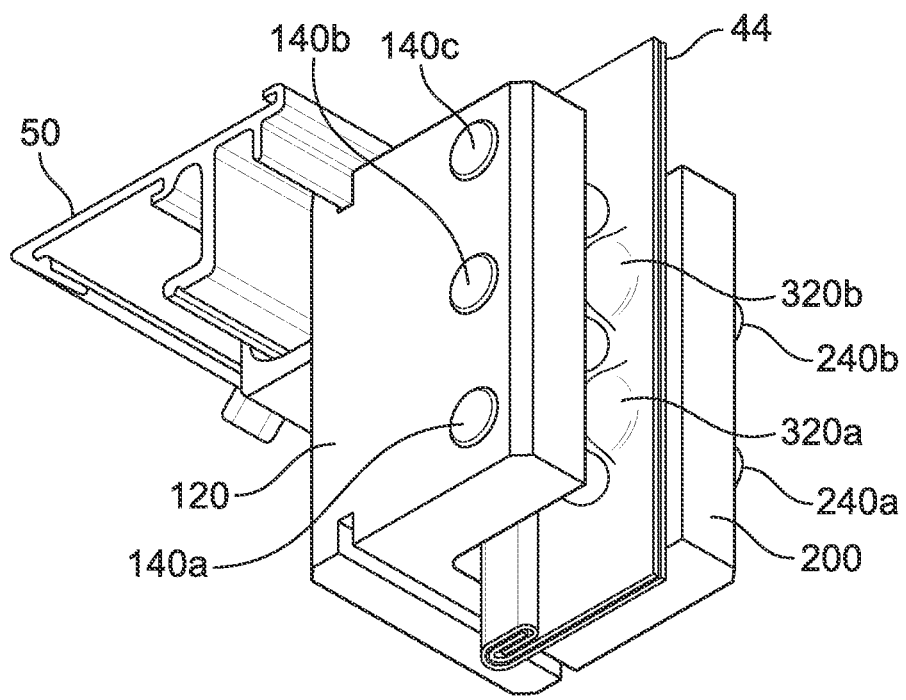
FIG. 13 is a bottom perspective view of the embodiment of the roof mounting bracket of FIG. 12 installed on a roof panel and further including a snow barricade coupled to bracket.
Figure 14:
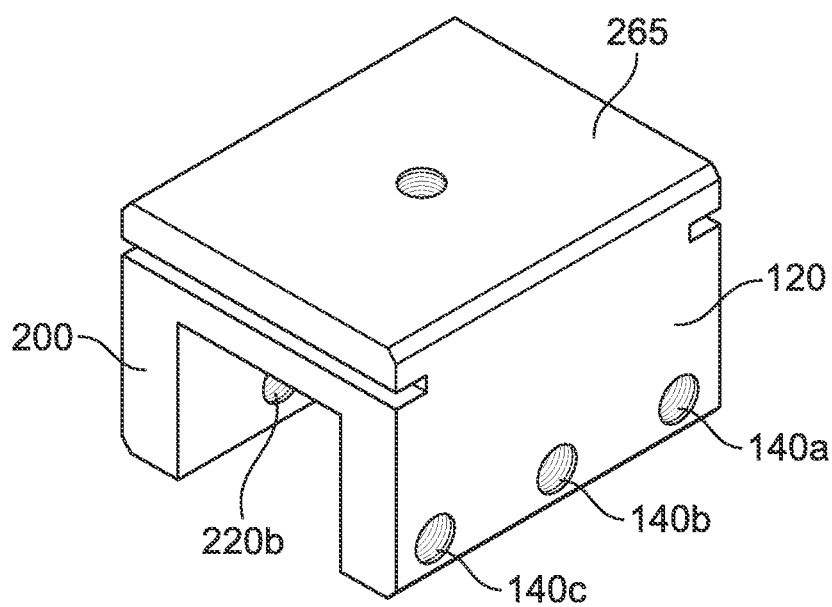
FIG. 14 is a perspective view of the embodiment of the roof mounting bracket of FIG. 12.

In alternative contemplated embodiments, the bracket can include varying numbers of fasteners in arms of bracket for creating additional wave deformations in panel seam using additional opposing screws. As seen in the embodiment in FIGS. 12-14, bracket 100 can include three fastener receivers 140a, 140b, 140c in first arm 120 and two fastener receivers 220a, 220b in the second arm 200 for creating additional deformations 300a, 300b, 300c and 320a, 320c in the seam 44. Creating additional deformations creates a stronger hold of the bracket 100 on the panel 40 by further preventing slide of the bracket on the panel 40. To secure the bracket 100 to the panel 40, the void in the bracket 100 is placed over the seam 44 with the first arm 120 on a first side of the seam 44 and the second arm 200 on the opposite side of the seam 44. First screws 160a, 160b, 160c are inserted into fastener receivers 140a, 140b, 140c and threaded therethrough until the heads 170a, 170b, 170c contact the seam 44, slightly engaging the seam 44 and creating first deformations 300a, 300b, 300c in the seam 44 as the screws 160a, 160b, 160c are tightened. Second screws 240a, 240b are then inserted into second fastener receivers 220a, 220b and threaded therethrough until heads 250a, 250b contact the opposing side of seam 44 in the spaces between the first deformations 300a, 300b, 300c, engaging the seam 44 and creating second opposing deformations 320a, 320b in the seam 44 as the second screws 240a, 240b are tightened. The opposing deformations 300a, 300b, 300c and 320a, 320b create two "wave"-shaped distortions in the seam 44, securing the bracket 10 to the seam 44. Also contemplated are additional fasteners in arms of bracket for creating additional wave deformations in panel using additional opposing screws.

Figure 15A:
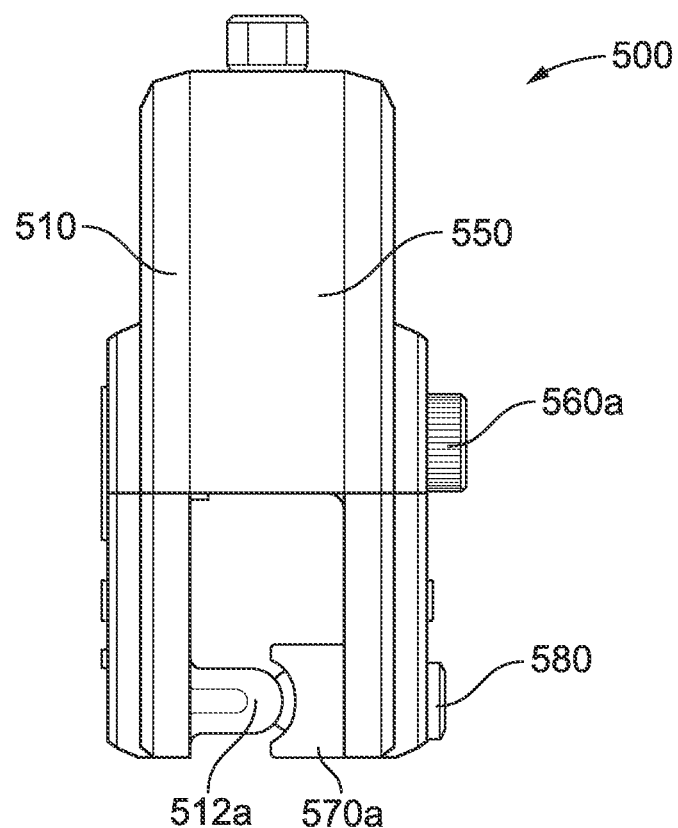
FIG. 15A is side view of an alternative embodiment of a roof mounting bracket in accordance with the present invention.
Figure 15B:
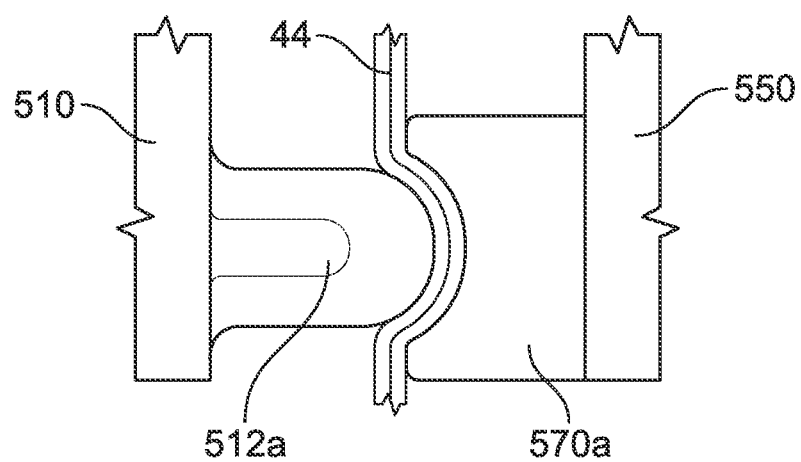
FIG. 15B is a detail view of a portion of the bracket in the embodiment in FIG. 15A, installed on a roof panel.
Figure 16:
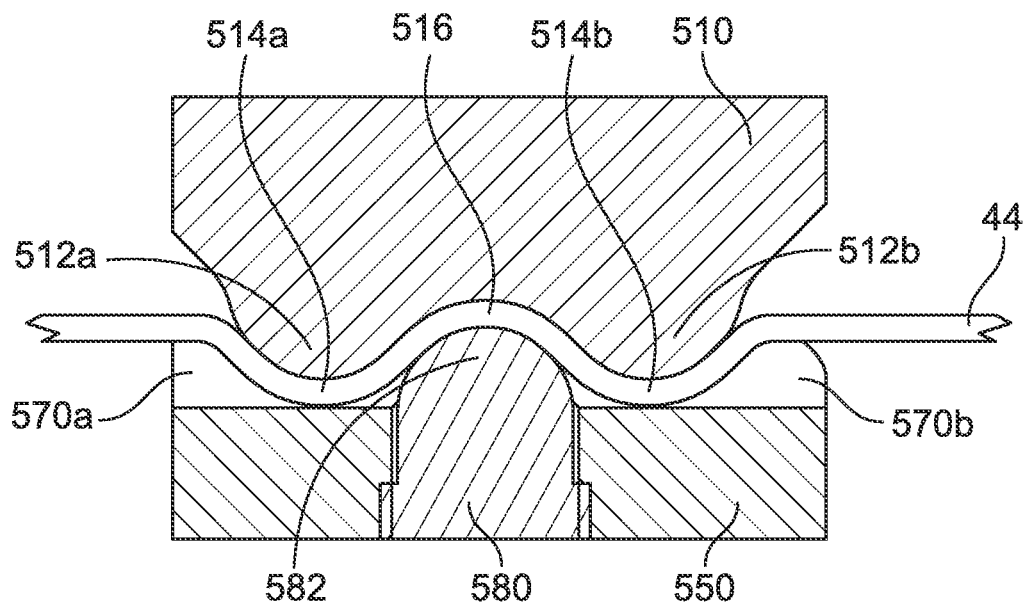
FIG. 16 is a cross-sectional view of the embodiment of a roof mounting bracket of FIG. 15A, installed on a roof panel.
Figure 17:
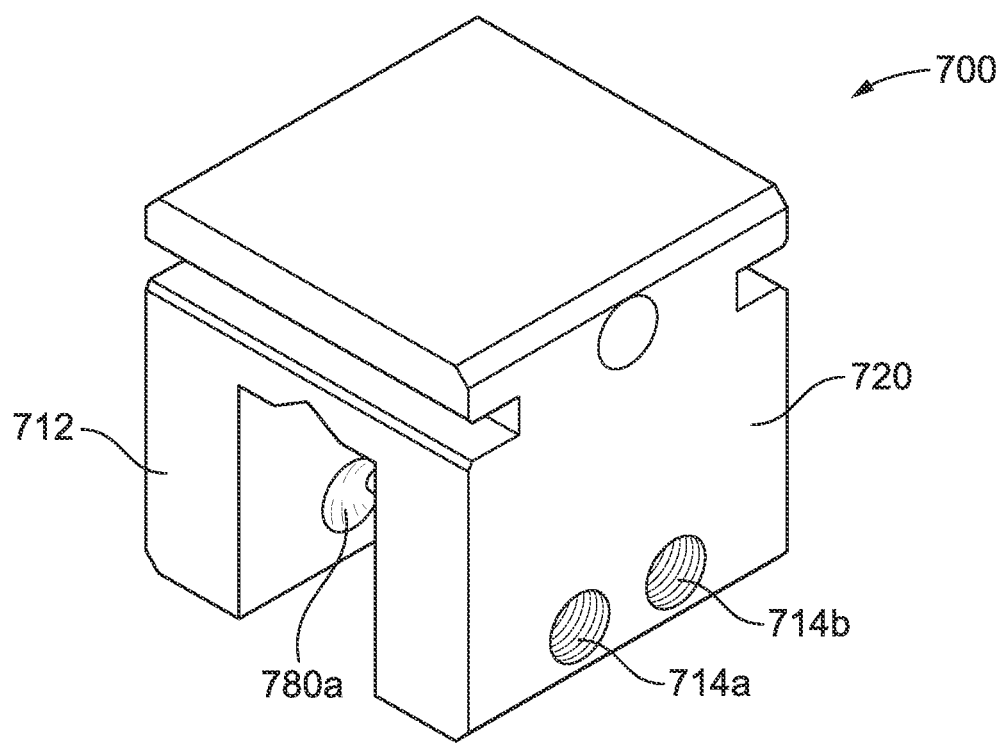
FIG. 17 is a perspective view of an another embodiment of a roof mounting bracket in accordance with the present invention.
Figure 18:
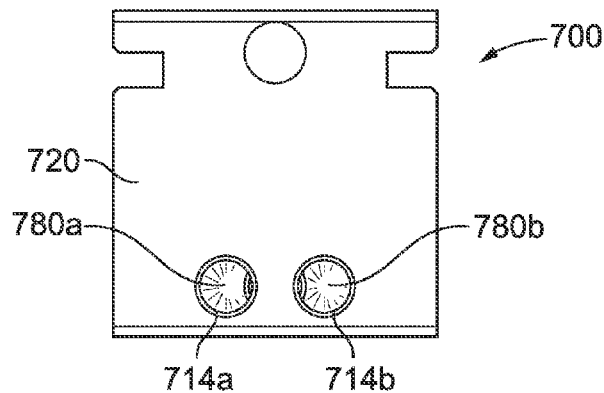
FIG. 18 is a side view of the embodiment of the roof mounting bracket of FIG. 17.
Figure 19:
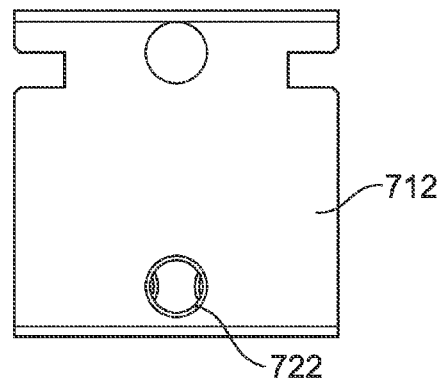
FIG. 19 is an opposite side view of the embodiment of the roof mounting bracket of FIG. 17.
Figure 20A:
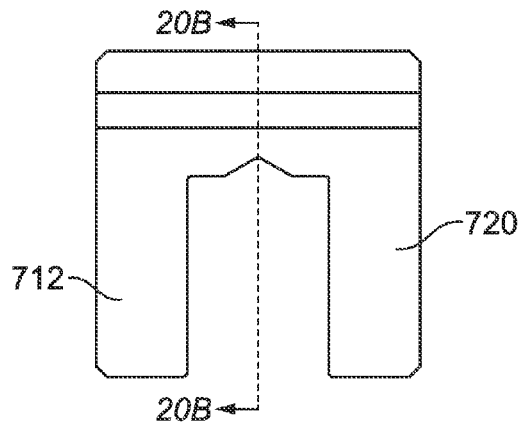
FIG. 20A is a front view of the embodiment of the roof mounting bracket of FIG. 17.
Figure 20B:
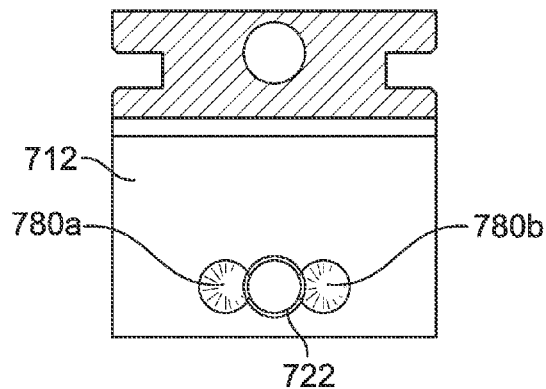
FIG. 20B is a section view along line 20B of FIG. 20A.
Figure 21:
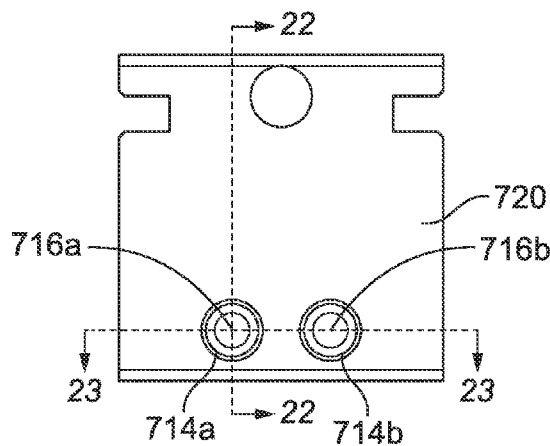
FIG. 21 is a side view of the embodiment of the roof mounting bracket of FIG. 17 with set screws threaded in fastener receivers.
Figure 22:
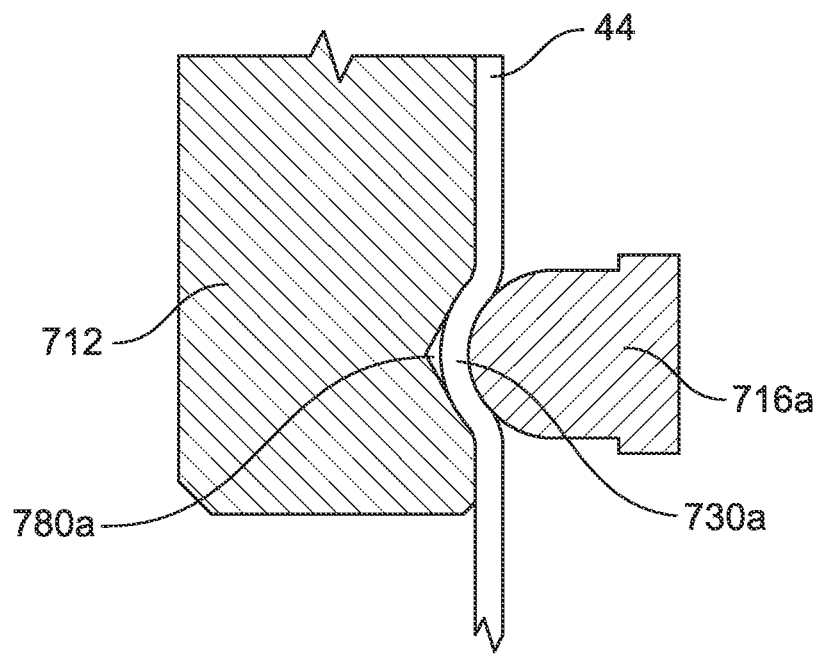
FIG. 22 is a cross-sectional view along line 22 of FIG. 21 of a set screw creating a first deformation recessed into a divot.
Figure 23:
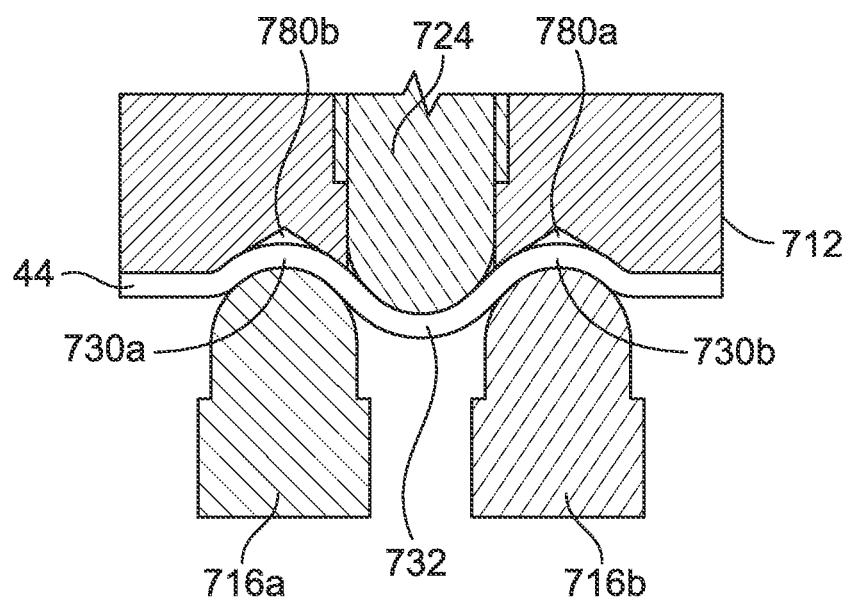
FIG. 23 is a cross-sectional view along line 23 of FIG. 21.

In a further alternative embodiment shown in FIGS. 15A, 15B and 16, bracket 500 is comprised of first member 510 and second member 550. First 510 and second 550 members are placed on either side of seam 44 and secured together using first screws 560a, 560b (not shown) which are threaded through fasteners (not shown) in second member 550 and engaged to fasteners (not shown) in first member 510 to secure first 510 and second 550 members together around seam 44. In the embodiment shown in FIGS. 15-16, the first member 510 comprises two posts 512a, 512b. Second member 550 comprises corresponding receiving channels 570a, 570b. Posts 512a, 512b create first deformations 514a, 514b in seam 44 as first screws 560a, 560b are tightened and deformations reset into receiving channels 570a, 570b to secure first 510 and second 550 members together around the seam 44. The second member 550 includes a third fastener receiver (not shown) through which second screw 580 passes. As second screw 580 is tightened, the screw head 582 engages the seam 44 in the space between the deformations 514a, 514b on the opposite side of the seam 44, engaging the seam 44 and creating second deformation 516 in the seam 44 as the screw 580 is tightened. The opposing deformations 514a, 514b and 516 create a "wave"-shaped distortion in the seam 44, securing the bracket 500 to the seam 44. The opposing deformations 514a, 514b and 516 allow secure attachment of the bracket 10 to the seam 44 without having to "dimple" or dent the seam 44 using a single set screw, requiring less force by the user. In alternative contemplated embodiments, bracket 500 can include varying numbers of feet in first arm 510 of bracket 500 for creating additional wave deformations in seam 44. For example (not shown) first arm 510 could comprise three feet to create three first deformations in panel as first screws are tightened to secure first 510 and second 550 members together around the seam 44. Second arm 550 could comprise two fastener receivers through which two screws pass such that screw heads create contact the panel on the opposite side of the panel in the spaces between the first deformations, engaging the seam 44 and creating two second deformations in the seam 44 as the screws are tightened. The opposing deformations in this embodiment would thus create two "wave"-shaped distortions in the seam 44, securing the bracket 500 to the seam 44. In a preferred embodiment, the manufacturing of bracket 500 is done by die casting, with additional holes being drilled and tapped as a secondary operation through a CNC machine, and then trimmed, deburred and tumbled for a smooth finish on the final product.

In another embodiment shown in FIGS. 17-23, the bracket 700 includes two or more divots 780a, 780b on the inside of the first arm 712. The divots 780a, 780b are positioned opposite the threaded fasteners 714a, 714b of the second arm 720. The divots 780a, 780b are shaped to correspond to the heads of screws 716a, 716b, such that when the screws 716a, 716b are tightened to create first deformations 730a, 730b in the panel 44, the first deformations 730a, 730b recessed into the divots 780a, 780b to create a more secure attachment of the bracket 700 to the panel 44. A second screw 724 is then inserted into the fastener receiver 722 of the first arm 712 and threaded therethrough until the head 725 contacts the opposing side of the seam 44 in the space between the first deformations 730a, 730b, engaging the seam 44 and creating a second opposing deformation 732 in the seam 44 as the screw 724 is tightened to create the "wave"-shaped distortion in the seam 44, securing the bracket 700 to the seam 44.

It is further contemplated that this embodiment of the bracket can include varying numbers of fastener receivers in arms of bracket and divots for creating additional wave deformations in panel seam using additional opposing screws. As seen in the embodiment in FIGS. 24-26, second arm 820 of bracket 800 can include three fastener receivers 814a, 814b, 814c. First arm 812 can include three divots 880a, 880b, 880c and two fastener receivers 822a, 822b for creating additional deformations 830a, 830b, 830c and 832a, 832b in the seam 44. Creating additional deformations creates a stronger hold of the bracket on the panel by further prevention for slide of the bracket on the panel. To secure the bracket 800 to the seam 44, the void in the bracket 800 is placed over the seam 44 with the first arm 812 on a first side of the seam 44 and the second arm 820 on the opposite side of the seam 44. First screws 816a, 816b, 816c are inserted into fastener receivers 814a, 814b, 814c and threaded therethrough until the heads 817a, 817b, 817c contact seam 44, slightly engaging the seam 44 and creating first deformations 830a, 830b, 830c in the seam 44 as the screws 816a, 816b, 816c are tightened. The first deformations 830a, 830b, 830c recess into the divots 880a, 880b, 880c, allowing the panel 44 to be secured more firmly to the first arm 812. Second screws 824a, 824b are then inserted into second fasteners 822a, 822b and threaded therethrough until the heads 825a, 825b contact the opposing side of the seam 44 in the spaces between the first deformations 830a, 830b, 830c, engaging the seam 44 and creating second opposing deformations 832a, 832b in the seam 44 as the second screws 824a, 824b are tightened. The opposing deformations 830a, 830b, 830c and 832a, 832b create two "wave"-shaped distortions in the seam 44, securing the bracket 800 to the seam 44. Also contemplated are additional fastener receivers in arms of bracket and additional corresponding divots for creating additional wave deformations in the panel using additional opposing screws.

Figure 24:
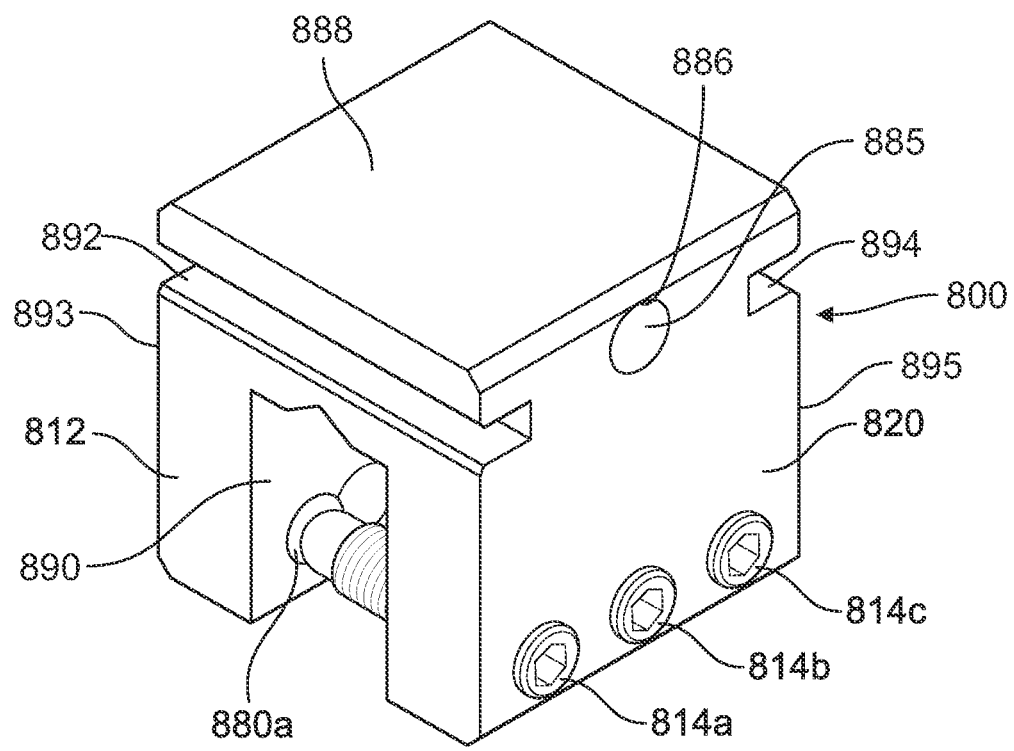
FIG. 24 is a perspective view of an alternative embodiment of a roof mounting bracket in accordance with the present invention.

As shown in this embodiment, bracket 800 has a cavity 885. Cavity 885 is located generally near the top of the bracket 800. A top edge of cavity 886 is approximately between 0.0625 to 0.25 inches from a top surface 888 of the bracket 800. Cavity 885 has an axis extending generally at a right angle to the axis of void 890. As shown in FIG. 24, cavity 885 extends all of the way through the bracket 800. However, the cavity 885 does not necessarily extend all of the way through the bracket 800.

As shown in this embodiment, bracket 800 also has a first keyway 892 and a second keyway 894 defined in a first side 893 and second side 895 of the bracket 1100, respectively. First keyway 892 and second keyway 893 are located near the top of the bracket 800 and each has an axis generally perpendicular to the axis of the cavity 885 and ninety degrees to the axis of the void 890.

Figure 27:
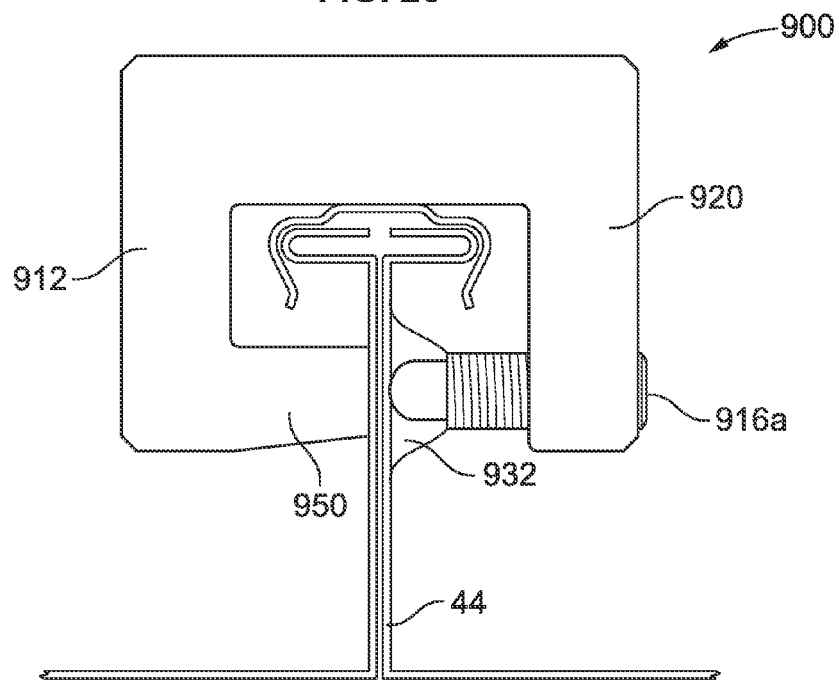
FIG. 27 is a front view of a further alternative embodiment of a roof mounting bracket in accordance with the present invention, installed on a panel seam.
Figure 28:
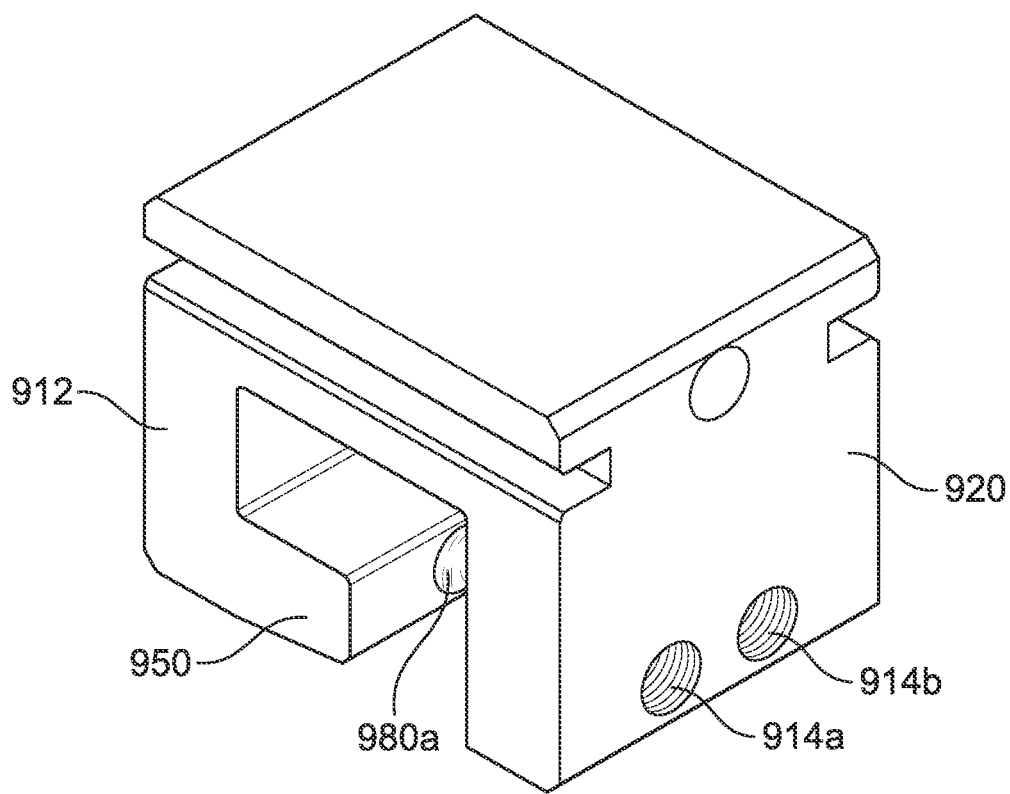
FIG. 28 is a perspective view of the embodiment of the roof mounting bracket of FIG. 28.

In a further alternative embodiment shown in FIGS. 27-28, bracket 900 can include an extrusion portion 950 extending from the first arm 912 into the opening between the first arm 912 and the second arm 920. The extrusion portion 950 aids in centering the bracket 900 on the seam 44, and can be shaped to fit varying configurations of seams 44. Similar to the embodiments described above, divots 980a, 980b (not shown) are positioned opposite the threaded fastener receivers 914a, 914b of the second arm 920. The divots 980a, 980b are shaped to correspond to heads of screws 916a, 916b (not shown), such that when screws 916a, 916b are tightened to create first deformations (not shown) in panel 44, deformations recessed into divots 980a, 980b (not shown) to create a more secure attachment of bracket 900 to panel 44. Second screw (not shown) is then inserted into fastener receiver (not shown) and threaded therethrough until head contacts the opposing side of the seam 44 in the space between the deformations (not shown), engaging the seam 44 and creating a second opposing deformation 932 in the seam 44 as the screw is tightened to create the "wave"-shaped distortion in the seam 44, securing the bracket 900 to the seam 44. Extrusion portion 950 could also be coupled to second arm 920 (not shown) to accommodate varying seam 44 configurations, and could have varying shapes and dimensions to accommodate varying seam 44 configurations.

Figure 29:
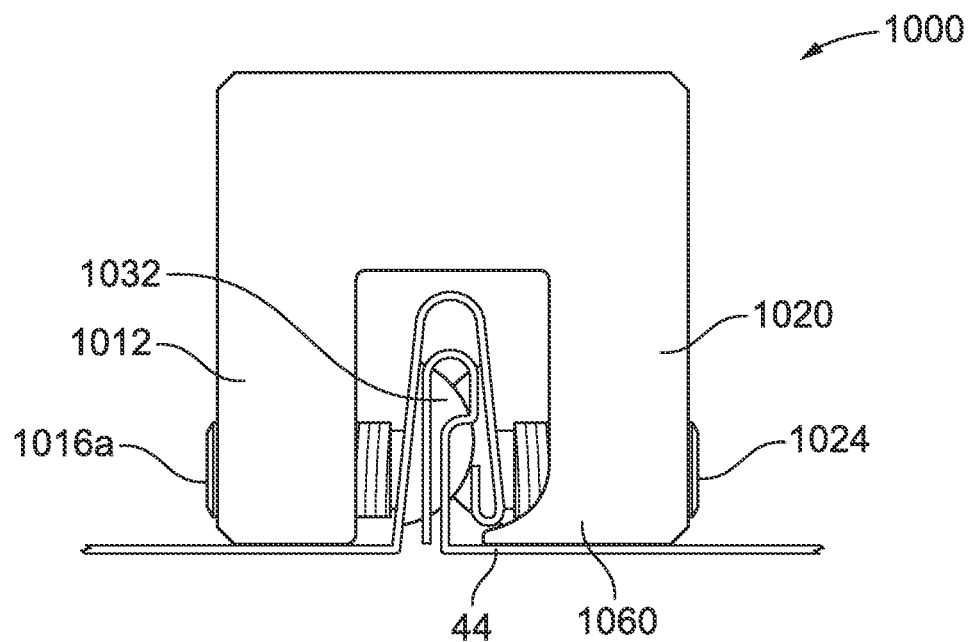
FIG. 29 is a front view of a further alternative embodiment of a roof mounting bracket in accordance with the present invention, installed on a panel seam.
Figure 39:
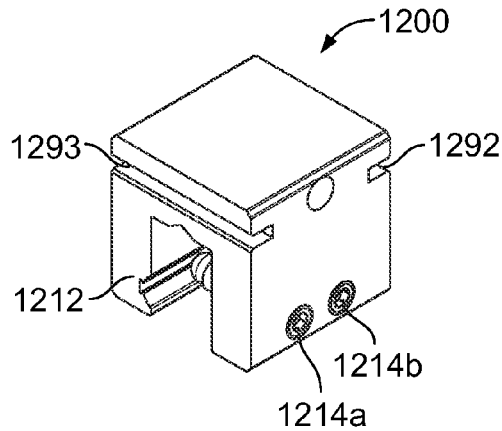
FIG. 39 is a perspective view of the bracket of FIG. 33 with the compression member removed.
Figure 40:
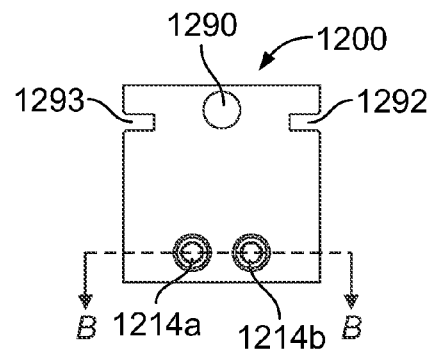
FIG. 40 is a side view of the bracket of FIG. 39.
Figure 41:
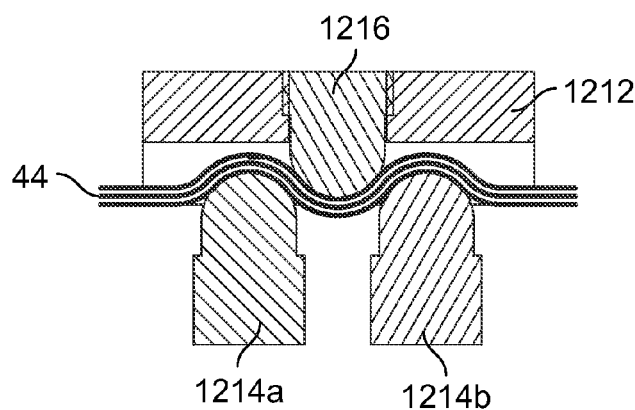
FIG. 41 is a cross sectional view along line B-B in FIG. 40 installed on a roof seam.
Figure 42:
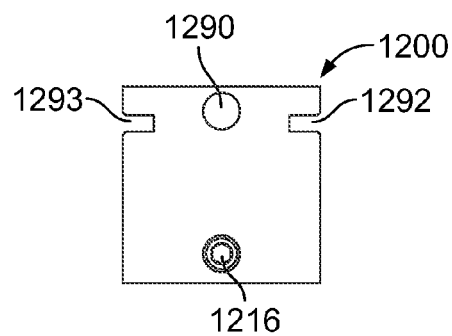
FIG. 42 is a side view of the bracket of FIG. 39.
Figure 43:
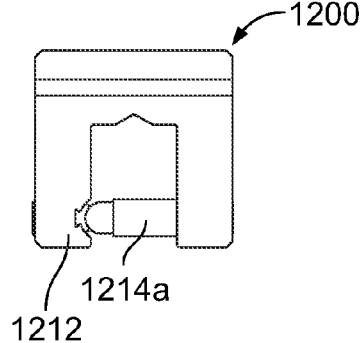
FIG. 43 is a front view of the bracket of FIG. 39.
Figure 44:
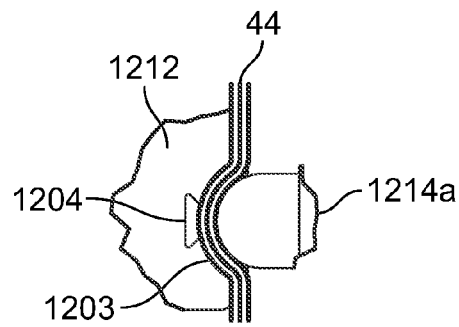
FIG. 44 is a partial front view of the bracket of FIG. 39 installed on a roof seam.
Figure 49:
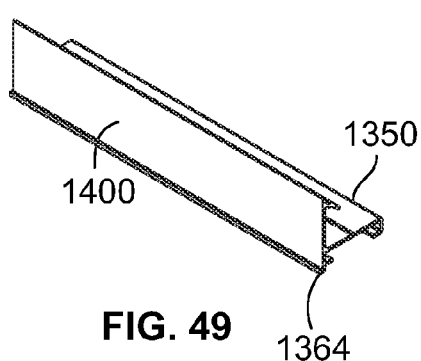
FIG. 49 is a perspective view of the retention member and panel of the system of FIG. 45.

In yet a further embodiment seen in FIG. 29, bracket 1000 may include a lip 1060 extending from second arm 1020 which can hook under a portion of the panel seam 44 to prevent the bracket 1000 from riding up the seam 44 as the set screws 1016a, 1016b (not shown) and 1024 are torqued to create first deformations (not shown) and opposing "wave" deformation 1032. Lip 1060 could also be coupled to first arm 1012 (not shown) to accommodate varying seam 44 configurations, and could have varying shapes and dimensions to accommodate varying seam 44 configurations.

In yet another embodiment shown in FIGS. 30-33, bracket 1200 includes a compression member 1250. Bracket 1200 has a compression member channel 1202. Compression member channel 1202 is formed in an interior surface 1213 of the second wall 1212 of the bracket 1200. The second wall is sometimes also referred to herein as the second member of the bracket. Compression member channel 1202 runs parallel to a base surface 1289 and top surface 1288 of bracket 1200. As shown in FIGS. 30 and 31b, compression member channel 1202 has a first portion 1203 comprising a concave cross sectional shape and a second portion 1204 having a dovetail cross sectional shape.

Compression member 1250 slidably engages to the second wall 1212 via compression member key 1254, which has a cross sectional shape corresponding to the second portion 1204 of the compression member channel. Compression member also has a convex wall 1253, from which the compression member key 1254 extends. The compression member convex wall 1253 corresponds in cross sectional shape to the first portion 1203 of the compression member channel, thereby allowing the compression member 1250 to slide into and out of the second wall 1212. As shown in FIGS. 31a-33, Compression member 1250 further has a concave wall 1255 opposite the convex wall 1253. Compression member 1250 further includes a bore 1260, sized to permit screw 24 to pass through the bore and contact the seam. Screw 24 also laterally retains the compression member 1250 from sliding out of the first wall 1212.

The slidable engagement of the compression member 1250 to the second wall 1212 enables a single bracket to accommodate either a wide or narrow roof seam. For example, when used in connection with a narrow seam, a user would leave the compression member engaged to the second wall. Such use is shown in FIGS. 33-38. The user would fasten the screws 1214a and 1214b and 1216 as described above in connection with prior embodiments, such that the heads of screws 1214a and 1214b would deform the seam 44 against the concave wall 1255 of the compression member, thereby retaining the seam 44 between the heads of screws 1214a and 1214b and the concave wall 1255. Screw 1216 in second wall 1212 extends through compression member 1250. As screw 1216 is tightened, its screw head engages the opposite side of the seam 44, and creates a second deformation in the seam 44 between the deformations formed by the heads of the first screws 1214a and 1214b. The opposing deformations thereby create a "wave"-shaped distortion in the seam 44, securing the bracket 1200 to the seam 44. The opposing deformations allow secure attachment of the bracket 1200 to the seam 44 without having to "dimple" or dent the seam 44 using a single set screw, requiring less force by the user.

FIGS. 39-44 show use of bracket 1200 in connection with a wide seam. In such uses, a user could back out screw 1216 from the compression member 1250, and slide the compression member 1250 from the second wall 1212 to remove it. With the compression member 1250 removed, the user can then place the bracket 1200 over the wide seam and fasten the screws 1214a, 1214b and 1216 as described above. With the compression member removed the heads of screws 1214a and 1214b will the compress seam 44 against the second portion of the compression member channel 1203.

In these embodiments, the deformation of the seam 44 against either the concave wall 1255 of the compression member or the concave portion of the compression member channel 1203 in the second wall prevents movement of the bracket 1200 with respect to the seam 44 in the vertical direction. The concave wall 1255 of the compression member 1250 is positioned approximately in the center of the bracket 1200. This configuration helps a user to center the bracket 1200 on the seam 44, by aligning the concave wall of the compression member with the seam 44. This can be useful in installations in which precise placement of the clamp centered on the seam 44 is important.

As described in more detail below, bracket 1200 has a first and second keyway 1292 and 1293, formed in opposite sides of the bracket 1200, for retaining a retention member.

FIGS. 45-52 show a first embodiment of a roof mounted system for snow retention 1300. This embodiment comprises bracket 1200, a retention member 1350, and a retention member fastener 1380.

The retention member 1350 is connected to bracket 1200 and may be connected to and span between multiple brackets 1200. Retention member 1350 has a base portion 1352 adjacent to and generally parallel with the top surface of bracket 1200. A first side 1354 of retention member 1350 extends from the base portion 1352 in a direction generally perpendicular to the base portion 1352. A second side 1356 of retention member 1350 is opposite the first side 1354 and extends from and generally perpendicular to the base portion. A first key 1355 extends from the first side 1354 inward towards the bracket 1200 and a second key 1357 extends from the second side 1356 inwards towards the bracket 1200. First key 1355 extends into the first keyway 1292 and second key 1357 extends into the second keyway 1293, (shown in detail in FIGS. 30 and 33) thereby slidably retaining the retention member 1350 to the bracket 1200. This configuration restricts vertical movement of the retention member 1350 to the bracket 1200, but allows for lateral movement between the retention member 1350 and the bracket 1200 in the direction of the keyways.

The retention member 1350 also has a retention member wall 1360 that extends upward from the base portion 1352. Retention member wall 1360 extends in a plane generally perpendicular to the plane of the roof surface and creates a block or barricade for ice or snow sliding down a sloped roof surface. Near the top of the retention member wall 1360 a retention member arm 1362 extends downward from the wall 1360 at an acute angle to the wall 1360 and inward towards the bracket 1200. The retention member also has a lip 1364 located at and extending from the bottom of the first side 1354.

As shown in FIG. 45, the distance between the first side 1354 and the second side 1356, D1, is greater than the length of the top surface of the bracket 1200 L1 to permit some adjustment of the retention member 1350 to the bracket 1200 in a direction perpendicular to the keyways. Similarly, the distance between an end of the first key 1355 and an end of the second key 1357 D2 is greater than the width between the keyways W2. This configuration allows for some adjustment of the position of the retention member 1350 to account for misalignment of brackets 1200 from one roof seam to another.

Figure 50:
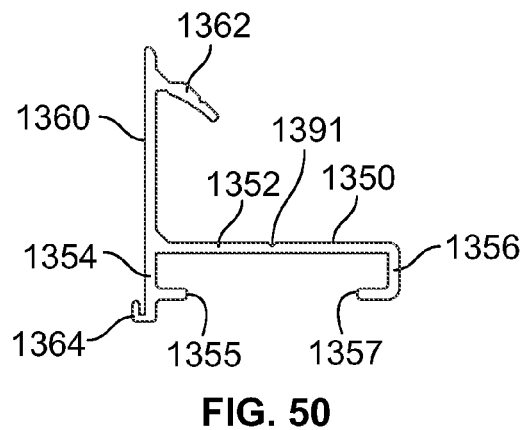
FIG. 50 is a side view of the retention member of the system of FIG. 45.
Figure 51:
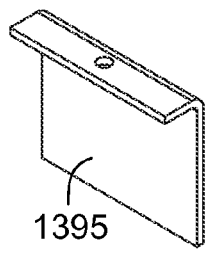
FIG. 51 is a perspective view of a plate of the system of FIG. 45.
Figure 52:
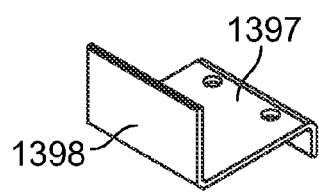
FIG. 52 is a perspective view of a splice of the system of FIG. 45.

Retention member fastener 1380 connects retention member 1350 to bracket 1200. Retention member fastener 1380 is a self-tapping screw. During assembly of the system, the retention member 1380 is threaded through the base portion 1352 of the retention member and into the bracket 1200 through the top surface 1288 of the bracket. The retention member extends into the cavity 1290. Cavity 1290 provides space for material displaced from the bracket 1200 during the tapping process to be discharged, which minimizes the torque necessary to thread the self-tapping screw into the bracket 1200 and enables the fastener 1380 to thread into the bracket 1200 without breaking. Retention member fastener 1380 prevents the retention member 1350 from sliding relative to the bracket 1200. In certain embodiments, as shown in FIG. 50, the retention member 1350 has a groove 1391 on the top surface of the base portion 1352 of the retention member 1350. The groove 1391 generally aligns with the cavity 1290 when the retention member 1350 is slidably engaged to the bracket 1200 so that a user can align the fastener 1380 with the groove 1391 to ensure that the fastener enters the cavity 1290 when threaded into the bracket 1200.

A panel 1400, which is typically made from the same material as the metal roof, or may be painted or color matched to the metal roof, is retained to the retention member 1350. In the embodiment shown in FIGS. 45-50, panel 1400 has a wall portion 1402 and an arm portion 1404. Wall portion 1402 has a bottom edge 1403, which is slidably retained in retention bracket lip 1364. Arm portion 1404 extends at an angle from a top edge of the panel wall portion 1402 at an angle similar to the angle of the retention member arm 1362 to the retention member wall 1360. The joint of the panel wall portion 1402 and panel arm 1404 may abut and be supported by a top edge of the retention member wall 1360. A panel fastener 1450 passing through the panel arm 1404 and the retention member arm 1362 connects the panel 1400 to the retention member 1350. Panel fastener 1450 is shown as a self-tapping screw.

Figure 53:
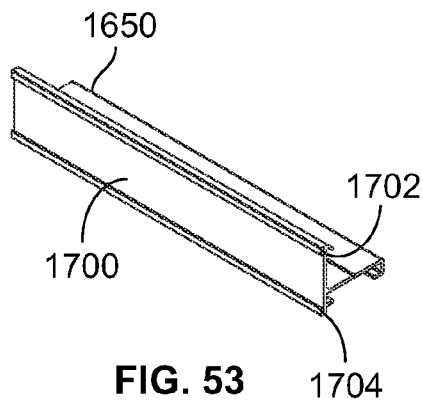
FIG. 53 is a perspective view of an alternative embodiment of a retention member and panel in accordance with the present invention.
Figure 54:
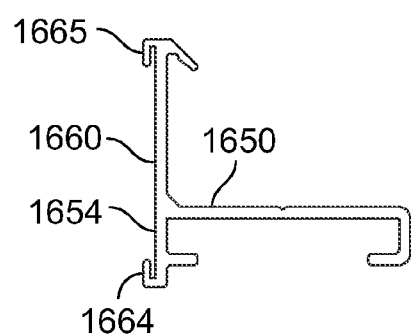
FIG. 54 is a side view of the retention member of FIG. 53.
Figure 59:
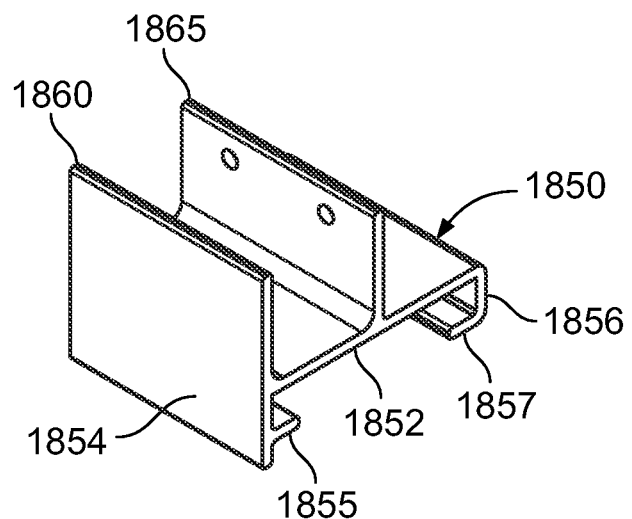
FIG. 59 is a perspective view of the retention member of the system of FIG. 55.

A second embodiment of a retention member 1640 and panel 1700 is shown in FIGS. 53 and 54. In this embodiment the retention member 1640 has a top lip 1665 extending near the top edge of the retention member wall 1660 and a bottom lip 1664 extending near the bottom edge of a first side 1654 wall. Panel 1700 is a generally flat panel with a top edge 1702 and a bottom edge 1704. The top edge of the panel 1702 and the bottom edge 1704 of the panel 1700 are slidably engaged to the top lip 1665 and bottom lip 1664 of the retention member 1650, respectively.

In certain embodiments, as shown in FIGS. 45-51, the system may further include one or more plates 1395 connected by fasteners to the retention member 1350. Plates 1395 may extend downward from the retention member 1350, thereby creating a surface that blocks ice or snow sliding down a sloped roof.

In certain embodiments, as shown in FIGS. 45-48 and 52, the system may further include one or more splices 1397, which are fastened to two adjacent retention members 1350, to connect the two retention members 1350 to one another. Splice 1397 has a wall portion 1398, with a top edge, which abuts the retention member 1350 at the intersection of the retention member wall 1360 and the retention member arm 1362, thereby retaining the splice 1397 to the retention member 1350.

A second embodiment of a roof mounted system 1800 for snow retention is shown in FIGS. 55-60. This system includes a bracket 1810, a retention member 1850, a spanning member 1870, fasteners 1900, 1902 and a plate 1895.

Figure 25:
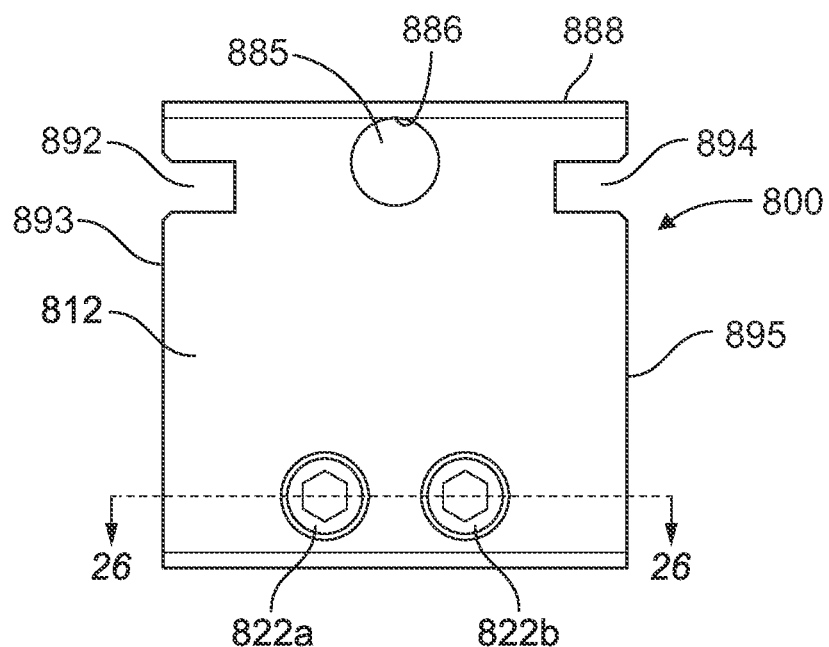
FIG. 25 is a side view of the embodiment of the roof mounting bracket of FIG. 25.
Figure 26:
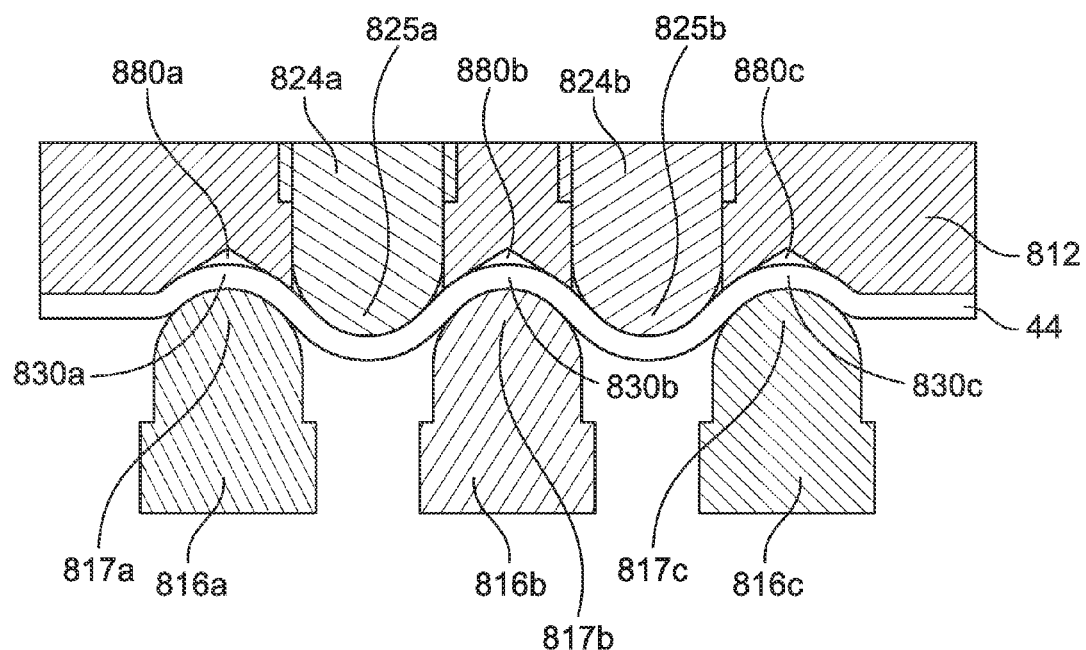
FIG. 26 is a cross-sectional view along line 27 of FIG. 26.

Bracket 1810 has the same configuration as bracket 800, shown in FIGS. 24-26, except that instead of having a cavity 885, bracket 1810 has a pair of threaded holes in the top surface 1818. Retention member 1850 has a base portion 1852 adjacent to and generally parallel with the top surface of bracket 1810. A first side 1854 of retention member 1880 extends from the base portion 1852 in a direction generally perpendicular to the base portion 1852. A second side 1856 of retention member 1850 is opposite the first side 1854 and extends from and generally perpendicular to the base portion 1852. A first key 1855 extends from the first side 1854 inward towards the bracket 1810 and a second key 1857 extends from the second side 1856 inwards towards the bracket 1810. First key 1855 extends into the first keyway and second key 1857 extends into the second keyway, thereby slidably retaining the retention member to the bracket. As with the retention members 1350 and 1450 described above and shown in FIGS. 53 and 54, this configuration restricts vertical movement of the retention member to the bracket, but allows for lateral movement between the retention member and the bracket in the direction of the keyways.

Also, similar to the prior embodiments, the distance between the first side 1854 and the second side 1856, D1, is greater than the length of the top surface of the bracket L1 and the distance between an end of the first key 1855 and an end of the second key 1857 D2 is greater than the width between the keyways W2 to allow for some adjustment of the position of the retention member to account for misalignment of brackets from one roof seam to another.

Figure 60:
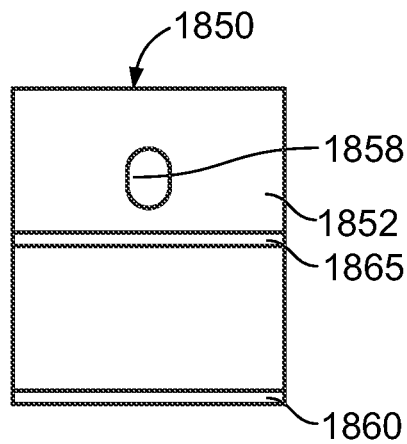
FIG. 60 is a top view of the retention member of the system of FIG. 55.

In certain embodiments, as shown in FIG. 60, the base portion 1852 of retention member 1850 may optionally have a slot 1858 for receiving a fastener 1900 that connects the retention member 1850 to the bracket.

The retention member 1810 also has a first retention member wall 1860 that extends upward from the base portion 1852. A second retention member wall 1865 extends from the base portion 1852 and parallel to the first retention member wall 1860.

The spanning member 1870, shown in FIGS. 55-58 as a square tube, fits between the first wall 1860, and the second wall 1865 of the retention member 1850. It will be appreciated that the spanning member could have a different cross sectional geometry, e.g. a rectangular or circular tube. The spanning member 1870 is retained to the second wall 1865 of the retention member by fasteners 1902. Fasteners 1902 are self-tapping fasteners that extend into the hollow interior of the square tube. The spanning member may span between multiple brackets, depending upon the length of the spanning member and the spacing of the brackets.

Plates 1895, are connected to and extend downward toward the roof from the spanning member 1870. Plates 1895 have a receiving portion 1896 sized to fit over the spanning member 1870 and are connected to the spanning member 1870 by fasteners 1898. Plates 1895 and spanning member 1870 form a barricade to block snow and ice sliding down a sloped roof surface.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A roof mounting bracket for securing accessories to seamed panel roof systems, the bracket comprising:
    a first member, the first member having coupled thereto two or more first projections, the two or more first projections defining a space between the projections;
    a second member disposed opposite the first member, the second member having one or more second projections, wherein the one or more second projections are positioned opposite the space between the first projections of the first member;
    a third member attached to the first member and the second member, whereby the third member, the first member and the second member define a void open at a bottom of the bracket and two sides of the bracket;
    a cavity passing through the third member and having an axis approximately ninety degrees to an axis of the void;
    wherein engaging the two or more first projections to a first side of a seam of a roof panel creates first two or more deformations in the roof panel seam; and
    wherein engaging the one or more second projections to an opposite side of the roof panel seam creates a second one or more deformations in the roof panel seam in the spaces between the first deformations, creating a generally wave-shaped distortion of the roof panel seam.

2. The roof mounting bracket of claim 1, wherein a top edge of the cavity is between 0.0625 and 0.25 inches below a top surface of the bracket.

3. The bracket of claim 1 wherein the two or more first projections comprise screws coupled to the first member by threads formed in the first member and the one or more second projections comprise screws coupled to the second member by threads formed in the second member.

4. The bracket of claim 3 wherein tightening the screws cause heads of the screws to engage the seam and create the first two or more deformations and the second one or more deformations in the roof panel seam.

5. The bracket of claim 2 further comprising a notch in the third member for aligning the roof panel seam within the void.

6. The bracket of claim 1 further comprising:
    a first keyway formed in the first member and having an axis parallel to the axis of the void; and
    a second keyway formed in the second member opposite the first keyway and having an axis parallel to the axis of the void.

7. An inverted U-shaped roof mounting bracket for securing accessories to seamed panel roof systems, the bracket comprising:
    a first member forming a first side of the bracket;
    a second member disposed opposite the first member and forming a second side of the bracket;
    a third member attached to the first member and the second member, thereby generally defining the inverted U shape of the bracket and a void in the U shape;
    two or more first projections extending from the first member into the void and defining a space between the projections;
    one or more second projections extending from the second member into the void, wherein the one or more second projections are positioned opposite the space between the first projections of the first member;
    a compression member engaged to the second member and disposed in the void; and
    a through hole through the compression member, wherein one of the one or more second projections extends from the second member through the through hole in the compression member to a seam of a roof panel.

8. The bracket of claim 7 wherein the two or more first projections comprise screws coupled to the first member by threads formed in the first member and the one or more second projections comprise screws coupled to the second member by threads formed in the second member.

9. The bracket of claim 7 further comprising:
    a channel formed on an interior surface of the second member; and
    a key extending from the compression member and sized to fit in the channel.

10. The bracket of claim 9 further comprising:
    a first portion of the channel on the interior surface of the second member having a concave cross sectional shape; and
    a concave wall on the compression member.

11. The bracket of claim 10 further comprising a convex wall on the compression member opposite the concave wall on the compression member.

12. The bracket of claim 9 further comprising a cavity passing through the third member and having an axis approximately ninety degrees to the axis of the void.

13. The bracket of claim 9 further comprising a first keyway in the first member and a second keyway in the second member.

14. A seamed panel roof mounting system comprising:
    an inverted U-shaped roof mounting bracket comprising a first member forming a first side of the bracket and having coupled thereto two or more first projections, the two or more first projections defining a space between the first projections, a second member disposed opposite the first member and forming a second side of the bracket and having one or more second projections, wherein the one or more second projections are positioned opposite the space between the first projections of the first member, and a third member attached to the first member and the second member, thereby generally defining the inverted U shape of the bracket and a the void in the U shape, the bracket having a first keyway on the first member and a second keyway on the second member;
    a retention member comprising: a base portion;
    a first key slidably engaged to the first keyway and a second key slidably engaged to the second keyway, thereby slidably engaging the retention member to the bracket;
    a retention member wall extending from the base portion; and
    a first lip; and
    a panel slidably engaged to the retention member via the first lip.

15. The seamed panel roof mounting system of claim 14 further comprising:

the two or more first projections extending from the first member of the bracket into the void;

the one or more second projections extending from the second member of the bracket into the void.

16. The seamed panel roof mounting system of claim 15 wherein the two or more first projections comprise screws coupled to the first member by threads formed in the first member and the one or more second projections comprise screws coupled to the second member by threads formed in the second member.

17. The seamed panel roof mounting system of claim 14 further comprising:

a cavity in the third member of the bracket having an axis approximately ninety degrees to an axis of the void; and a fastener connecting the retention member to the bracket and extending into the cavity.

18. The seamed panel roof mounting system of claim 14 further comprising:

a retention member arm extending at an angle from the retention member wall; and a panel arm portion extending at an angle from the panel wall portion.

19. The seamed panel roof mounting system of claim 14 further comprising a second lip on the retention member, wherein the panel is slidably engaged with the second lip.

20. The seamed panel roof mounting system of claim 14, wherein the panel is a different material than the bracket and the retention member.

21. A seamed panel roof mounting system comprising:

an inverted U-shaped roof mounting bracket comprising:

a first member forming a first side of the bracket and having a first keyway;

a second member disposed opposite the first member and forming a second side of the bracket and having a second keyway;

a third member attached to the first member and the second member and forming a top surface of the bracket;

wherein the first, second and third members generally defining the inverted U shape of the bracket and a void in the U shape;

two or more first projections extending from the first member of the bracket into the void and defining a space between the projections; and one or more second projections extending from the second member of the bracket into the void, wherein the one or more second projections are positioned opposite the space between the first projections of the first member; and a retention member comprising a base portion adjacent to a top surface of the bracket, a first key slidably engaged to the first keyway and a second key slidably engaged to the second keyway, thereby slidably engaging the retention member to the bracket.

22. The seamed panel roof mounting system of claim 21 wherein the two or more first projections comprise screws coupled to the first member by threads formed in the first member and the one or more second projections comprise screws coupled to the second member by threads formed in the second member.

23. The seamed panel roof mounting system of claim 21 further comprising a retention member wall extending from the base portion of the retention member.

24. The seamed panel roof mounting system of claim 21 further comprising:

a cavity in the third member of the bracket having an axis approximately ninety degrees to an axis of the void; and a fastener connecting the retention member to the bracket and extending into the cavity.

25. The seamed panel roof mounting system of claim 21 further comprising:

a first wall extending upward from the base portion of the retention member; and a second wall extending upward from the base portion of the retention member.

26. The seamed panel roof mounting system of claim 24 further comprising a spanning member disposed between the first wall and the second wall of the retention member.

27. The seamed panel roof mounting system of claim 25 further comprising a fastener retaining the spanning member to the second wall.

28. The seamed panel roof mounting system of claim 24 further comprising a plate connected to the spanning member and extending downward from the spanning member.

29. The seamed panel roof mounting system of claim 24 further comprising a fastener passing through the base portion of the retention member and into the bracket to retain the retention member to the bracket.

* * * * *